(12) United States Patent
Takeuchi

(10) Patent No.: US 10,459,062 B2
(45) Date of Patent: Oct. 29, 2019

(54) ANTENNA DIRECTIVITY CONTROL SIGNAL GENERATING APPARATUS, WIRELESS COMMUNICATION APPARATUS, WIRELESS COMMUNICATION CONTROL SYSTEM, ANTENNA CONTROL METHOD, AND NON-TRANSITORY COMPUTER READABLE MEDIUM

(71) Applicant: NEC CORPORATION, Tokyo (JP)

(72) Inventor: Toshiki Takeuchi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/765,859

(22) PCT Filed: Oct. 4, 2016

(86) PCT No.: PCT/JP2016/079495
§ 371 (c)(1),
(2) Date: Apr. 4, 2018

(87) PCT Pub. No.: WO2017/061429
PCT Pub. Date: Apr. 13, 2017

(65) Prior Publication Data
US 2018/0284217 A1 Oct. 4, 2018

(30) Foreign Application Priority Data
Oct. 5, 2015 (JP) .................... 2015-198008

(51) Int. Cl.
*H04M 1/00* (2006.01)
*G01S 3/782* (2006.01)
(Continued)

(52) U.S. Cl.
CPC ............ *G01S 3/782* (2013.01); *H01Q 1/22* (2013.01); *H04B 7/0452* (2013.01);
(Continued)

(58) Field of Classification Search
CPC .. G01S 3/782; H01Q 1/22; H04B 7/10; H04B 7/0452; H04B 7/0617; H04W 16/28; H04W 72/046
(Continued)

(56) References Cited

U.S. PATENT DOCUMENTS 6,473,055 B2   10/2002  Kohno et al.
8,068,844 B2   11/2011  Li et al.
(Continued)

FOREIGN PATENT DOCUMENTS

JP   2001-298389 A   10/2001
JP   2012-514425 A   6/2012
JP   2013-051570 A   3/2013

OTHER PUBLICATIONS

International Search Report of PCT/JP2016/079495 dated Nov. 29, 2016 [PCT/ISA/210].

*Primary Examiner* — Charles T Shedrick
(74) *Attorney, Agent, or Firm* — Sughrue Mion, PLLC

(57) ABSTRACT

An antenna directivity control parameter generating apparatus includes a memory that stores image processing data generated by image processing and a processor that calculates an antenna directivity control parameter for a base station based on the image processing data.

15 Claims, 16 Drawing Sheets

(51) Int. Cl.
  *H04B 7/10*      (2017.01)
  *H04W 16/28*     (2009.01)
  *H01Q 1/22*      (2006.01)
  *H04B 7/0452*    (2017.01)
  *H04B 7/06*      (2006.01)
  *H04W 72/04*     (2009.01)

(52) U.S. Cl.
  CPC ............ *H04B 7/0617* (2013.01); *H04B 7/10* (2013.01); *H04W 16/28* (2013.01); *H04W 72/046* (2013.01)

(58) Field of Classification Search
  USPC ...................................................... 455/562.1
  See application file for complete search history.

(56) References Cited

U.S. PATENT DOCUMENTS

| | | | |
|---|---|---|---|
| 8,594,691 | B2 | 11/2013 | Li et al. |
| 9,155,097 | B2 | 10/2015 | Li et al. |
| 10,090,887 | B1 * | 10/2018 | Rofougaran ............ H02J 50/50 |
| 2001/0052875 | A1 | 12/2001 | Kohno et al. |
| 2010/0164802 | A1 | 7/2010 | Li et al. |
| 2012/0040629 | A1 | 2/2012 | Li et al. |
| 2014/0018004 | A1 | 1/2014 | Li et al. |
| 2019/0082375 | A1 * | 3/2019 | Ise ...................... H04W 40/205 |

\* cited by examiner

FIG. 3A
FIG. 3B
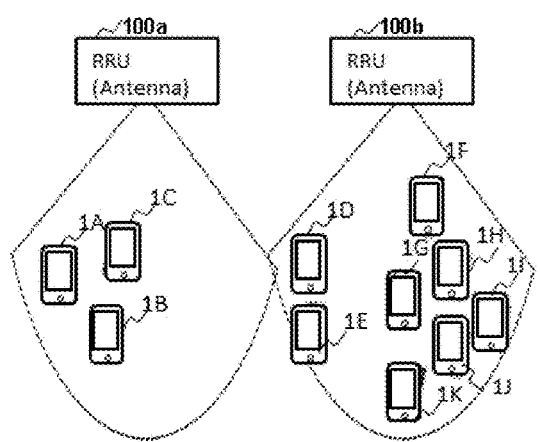
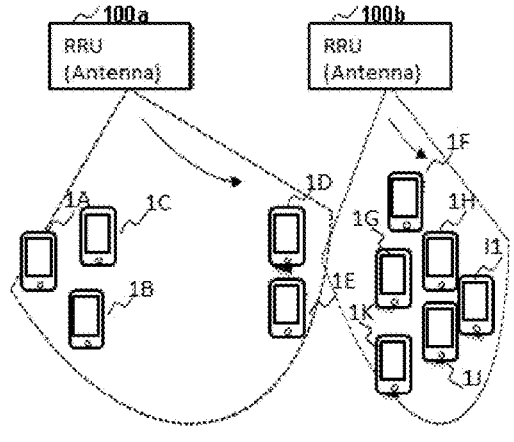
Cell Formation Default → Dynamic Cell Formation

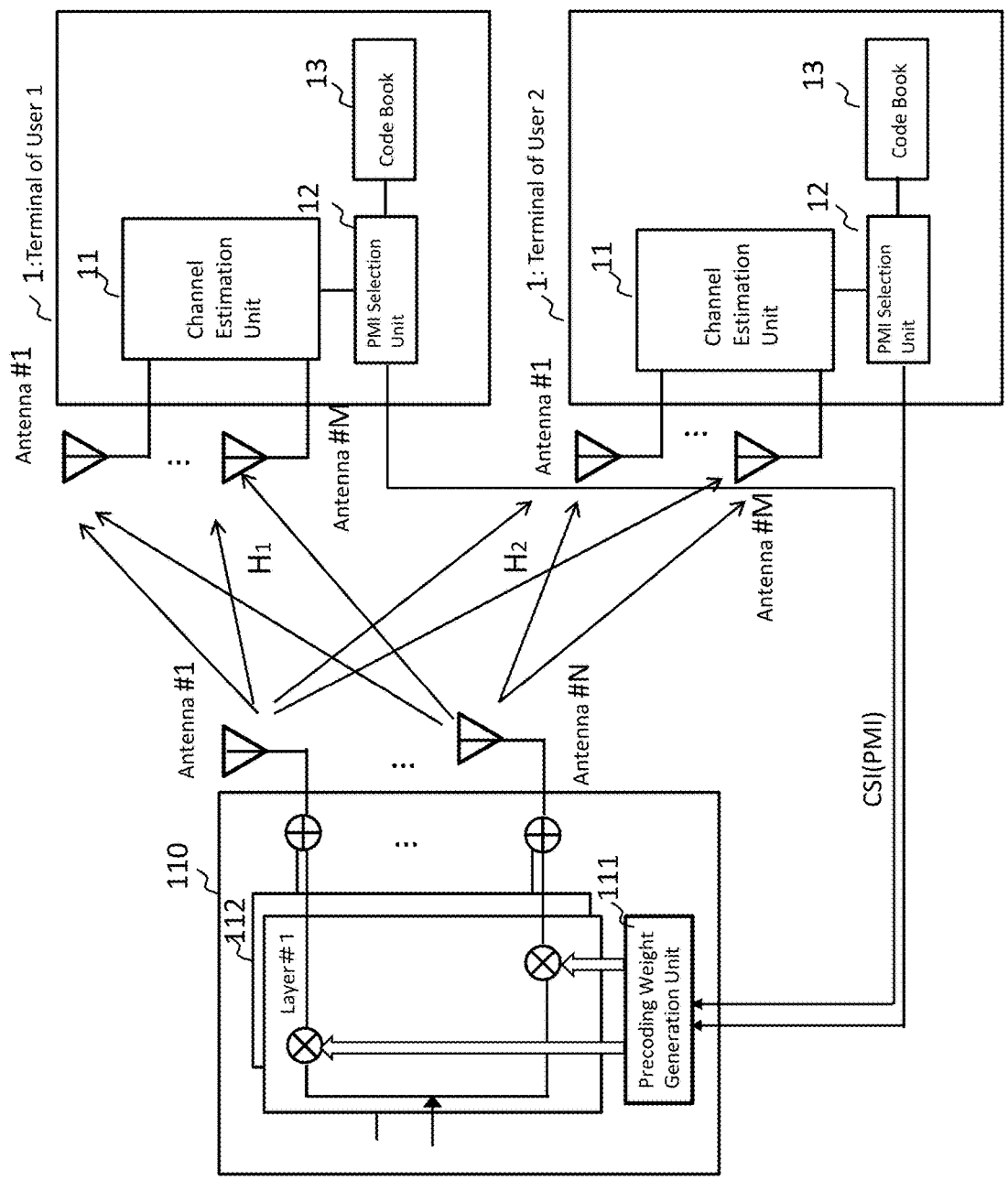

ANTENNA DIRECTIVITY CONTROL SIGNAL GENERATING APPARATUS, WIRELESS COMMUNICATION APPARATUS, WIRELESS COMMUNICATION CONTROL SYSTEM, ANTENNA CONTROL METHOD, AND NON-TRANSITORY COMPUTER READABLE MEDIUM

CROSS REFERENCE TO RELATED APPLICATIONS

This application is a National Stage of International Application No. PCT/JP2016/079495, filed Oct. 4, 2016, claiming priority based on Japanese Patent Application No. 2015-198008, filed Oct. 5, 2015, the contents of all of which are incorporated herein by reference in their entirety.

FIELD

The present invention relates to an antenna directivity control signal generating apparatus, a wireless communication apparatus, a wireless communication control system, an antenna control method, and a non-transitory computer readable medium storing therein a program for antenna directivity control.

BACKGROUND

Recent years have witnessed an explosive increase in data traffic of mobile communication with rapid wide-spread use of smartphones and tablet terminals, and the like. For example, at the 2007 World Wireless Conference (WRC-07 (World Radiocommunication Conference 2007)), an international agreement has been made by securing 3.5 GHz (Giga Hertz) band or the like as a frequency band for 4G (4th Generation) such as LTE (Long Term Evolution)-Advanced. In the future, in order to cope with traffic explosion, it is expected that these new frequency bands will be allocated for 4G and next 5G (5th Generation).

In addition, in order to increase a traffic capacity of an entire system, a heterogeneous network configuration in which a plurality of small cell base stations are installed in an area of a macro cell base station, a high density installation of small cell base stations, improvement of frequency utilization efficiency by advanced MIMO (Multi-Input Multi-Output) technology with a multi-element antenna (Massive MIMO), and so forth are under study. Furthermore, a movement towards a next generation, i.e., the 5th generation mobile communication standard (5G) has become active, such as an establishment of related promotion groups in each country. In the future, it is expected that applications that transmit and receive video data at a high bit rate will increase.

In order to accommodate an increase in traffic for each user, in particular, a beamforming technique for an individual user by multi-user MIMO (MU-MIMO) using multi-element antennas, is drawing attention. For example, beam formation is individually performed in a direction of a selected path using a multi-element antenna (antenna array). By using this technique, improvement of frequency utilization efficiency is expected by increasing a spatial multiplexing number in one base station cell.

Traffic for each radio base station may change from time to time, depending on, for example, an installation location of a radio base station. For example, in a case where a radio base station is installed in an office area, a traffic peak appears in a daytime which is a working time zone. In a case where a radio base station is installed in a residential area, a traffic peak appears from evening to night after a subscriber returning home. In either area, traffic usually decreases at midnight.

On the other hand, even in the same area, assuming a configuration in which a plurality of small cell base stations are installed at a high density in the area, when one or more users move in the area, the number of users served by the small cell base station with a small cell radii and an amount of accommodated traffic are largely fluctuated with time.

Therefore, a dynamic cell formation technology (cell virtualization) that dynamically changes a cell size and shape by beam forming or the like according to extent of fluctuation of user density (traffic density) for each small cell base station, etc., is also under consideration. The dynamic cell formation technology dynamically performs load balancing of users and traffic served and accommodated by each of small cell base station, as a result of which a capacity that can be accommodated as a whole is improved.

As standard beamforming, for example, in standards based on 3GPP (Third Generation Partnership Project) (3GPP TS 36.211, 3GPP 36.213, etc.), and in IEEE 802.11n, the subsequent 802.11ac, or the like, which is the standard of a wireless LAN (Local Area Network) established by IEEE (Institute of Electrical and Electronics Engineers, Inc), the following approach is assumed (an example in a case of transmission).

(a) Steering antennas in all directions within a cell/sector of a base station,
 searching for terminal location (direction), and
 calculating a precoding weight from an obtained steering angle.
(b) Calculating a precoding weight by matrix calculation on a side of a base station which has an estimated value of a propagation path (channel) that a terminal obtains, sent thereto
(c) When using the same frequency band in uplink and downlink (in a case of TDD (Time Division Duplex)), a known signal is transmitted from a terminal to the base station which estimates a transmission path (channel) to calculate a precoding weight using matrix operation.

The following describes an outline of an example of a precoding weight in LTE MU-MIMO and the like with reference to FIG. 16. In the LTE MU-MIMO, transmission information sequences destined for the terminals 1 of a plurality of users are simultaneously transmitted from different transmission antennas (#1 to #N) of the base station (evolved Node B: eNode B) 110. In the terminal 1, a channel estimation unit 11 estimates a channel from the signal transmitted from the base station 110. Then, for example, a PMI selector 12 selects an optimum PMI from the book in which a phase/amplitude control amount to be set to the antenna of the base station (a precoding matrix) and a plurality of PMIs (Precoding Matrix Indicators) associated with this precoding matrix are stored in advance. The terminal 1 feeds back the selected PMI, for example, as channel information (Channel State Information: CSI) to the base station 110. In the base station 110, a precoding weight generation unit 111 generates a precoding weight for each transmission antenna based on the PMI fed back from the terminal 1 and sets precoding weight as coefficients of a precoding matrix of a precoder 112. In FIGS. 16, H1 and H2 represent MIMO channel matrix (M×N) between base station antennas and terminal antennas. The number M of antennas of the terminal and the number N of antennas of the base station may be the same.

It is known that there is a problem in the approaches of related technology of the above (a), (b) and (c):

It takes time for search processing; and

Computation of precoding weight is complicated.

In the case of the configuration described with reference to FIG. 16, although a calculation amount of the precoding weight can be suppressed, there is a problem that, for example, the number of code books becomes large as the number of antennas increases.

For example, in the case of the approach (a), it is necessary to perform communication by steering antennas in all directions in a cell/sector, in order. For this reason, a trial time corresponding to the number of steering times is required for searching a location of a terminal (direction).

In the case of the approaches (b) and (c), a location of a terminal is not grasped, but a precoding weight from an estimated value of a propagation path (channel) is calculated by matrix operation. Therefore, if the number of antennas or the number of users performing spatial multiplexing is increased, calculation of the precoding weight is complicated. In order to improve accuracy, more complicated calculation is required.

Also, in the case of the approach (a), when using antennas with high directivity such as millimeter waves, the base station cannot receive information from a terminal(s) to which the base station cannot set direction of antennas thereof. For this reason, on the side of the base station, there are cases where even the direction to which the antenna should be directed is not known.

Similarly, in the case of the approaches (b) and (c), once a cell shape is made smaller by dynamic cell formation, there may be a case in which information on a propagation path (channel estimation) cannot be obtained from a terminal outside the cell range.

In recent years, in data processing (hereinafter referred to as "IT (Information Technology) processing" by an information processing system such as a server, an application requiring a large amount of data processing obtained by big data and M2M (Machine to Machine) communication has attracted attention.

As a specific example, there is an image recognition technology for autonomously recognizing a face of a person or an object by image processing of an image acquired by a surveillance camera. For example, a suspicious person monitoring system or the like that automatically registers face information of criminals or suspicious individuals as a black list and automatically detects a suspicious individual by face authentication/face collation processing using a surveillance camera image is expected.

In addition, such a system is expected that a mechanism for continuously tracking and following a detected suspicious individual(s), or a mechanism for identifying an ID of a target mobile terminal detected for identifying a suspicious individual, blocking communication of the terminal, grasping a terminal acquisition route, or the like is implemented. Through these mechanisms, it is considered good to early secure criminals and prevent crime. In this way, applications using cameras and images are expected to increase. It is conceived that usage in other fields other than the above will become common.

As a method of controlling an antenna of a wireless communication apparatus in combination with a camera image, there is known a technique in which a user location is grasped by image processing of the camera image, and the antenna is controlled so as to include the user location. For example, Patent Literature 1 discloses a technique of controlling an antenna of a wireless communication apparatus in combination with a camera image by photographing an image of a space to be a target of wireless communication with a camera, an image acquisition unit acquires a user location of a wireless communication terminal and changes a directivity of the antenna so as to include the specified user location. Patent Literature 1 describes that unexpected leakage and interference of transmitted radio waves can be suppressed.

[Patent Literature 1]
JP patent Kokai Publication No. JP2013-51570A

SUMMARY

The analysis of related technologies is given below.

In a method of steering an antenna, and a method of obtaining an antenna directivity control parameter by matrix operation using a channel estimation value, that are generally used as a method of antenna directivity control for dynamic cell formation and individual beamforming for each user, there are the following problems:

a search process takes time; and computation of precoding weight is complicated.

A base station side does not necessarily grasp a location of a terminal. Therefore, when an antenna of the base station is an antenna with high directivity such as millimeter wave or the like, it is difficult to direct the antenna toward the terminal itself.

Furthermore, when forming a dynamic cell, once a cell shape is reduced, information on a channel (channel estimation) cannot be obtained from a terminal located outside a cell range.

Regarding the technique disclosed in Patent Literature 1, since the object thereof is to suppress leakage and interference of transmitted radio waves in an arbitrary cell, it cannot deal, as it is, with formation of a cell in which a plurality of users and traffic are load balanced by cooperating a plurality of cells/sectors. Further, in the technique disclosed in Patent Literature 1, since only a type, an angle (phase) and of an antenna, and power are adjusted based on a location of a user, it cannot deal with a case in which the number of spatial multiplexing is increased by individual user beam forming (Multi-User MIMO, etc.).

The present invention is invented to solve the above problems. It is therefore one of objects of the present invention is to provide an apparatus, a method, and a non-transitory computer readable medium storing therein a program, each enabling to improve accuracy of antenna directivity control while reducing a processing time and a calculation amount. It should be noted that this object is only one of several objects that example embodiments disclosed in this document are intended to achieve, and that other objects, features, etc. will be obvious from disclosure of the present specification.

According to one aspect of the present invention, there is provided an antenna directivity control signal generating apparatus comprising: a memory for storing image processing data generated by image processing; and a processor that calculates an antenna directivity control parameter for a base station, based on the image processing data.

According to another aspect of the present invention, there is provided a wireless communication apparatus comprising a base station processing unit that performs at least a control function of an antenna of a base station that communicates with a wireless communication terminal, wherein the base station processing unit receives an antenna directivity control signal from the antenna directivity control signal generating apparatus, and based on the antenna directivity control signal, performs antenna directivity control for the base station.

According to another aspect of the present invention, there is provided a wireless communication control system comprising: an apparatus that performs at least a control function of an antenna of a base station that communicates with a wireless communication terminal; and an antenna directivity control signal generating apparatus that generates a signal that controls directivity of the antenna, wherein the antenna directivity control signal generating apparatus comprising a memory for storing image processing data generated by image processing; and a processor configured to calculate a control parameters of a directivity of the antenna of a base station, based on the image processing data.

According to still another aspect of the present invention, there is provided an antenna control method comprising: storing image processing data generated by image processing; and calculating an antenna directivity control parameter for a base station, based on the image processing data.

According to still another aspect of the present invention, there is provided a non-transitory computer readable medium storing therein a program causing a computer to execute processing comprising:

storing image processing data generated by image processing in a memory, and calculating an antenna directivity control parameter for a base station based on the image processing data. According to the present invention, the non-transitory computer readable medium may be a storage such as a semiconductor memory, HDD (Hard Disk Drive), CD (Compact Disc)/DVD (Digital Versatile Disc) or the like in which the program is recorded.

According to the present invention, it is possible to improve accuracy of antenna directivity control while reducing processing time and calculation amount.

BRIEF DESCRIPTION OF THE DRAWINGS

FIG. 3A and FIG. 3B are diagrams for explaining load balancing clustering for dynamic cell formation in the first example embodiment.

FIG. 16 is a diagram schematically explaining MU-MIMO of LTE.

DETAILED DESCRIPTION

Figure 15:
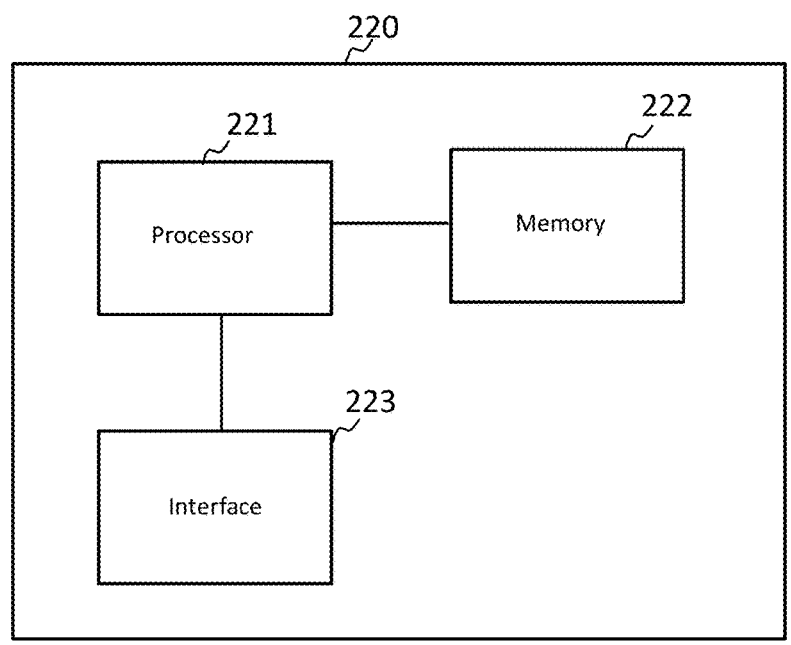
FIG. 15 is a diagram illustrating another embodiment of the present invention.

The following describes example embodiments of the present invention. First, basic concepts of several modes will be described with reference to FIG. 15. Referring to FIG. 15, an antenna directivity control signal generating apparatus 220 includes a memory 222 that stores image processing data generated by image processing, and a processor 221 that that calculates an antenna directivity control parameter for a base station based on the image processing data.

The antenna directivity control signal generating apparatus 220 further includes an interface 223 that receives input of image data. The processor 221 may be configured to perform:

image processing that recognizes one or more users from the image data; user location estimation that estimates user location information based on a recognition result of the image processing;

user clustering processing that performs user clustering for dynamic cell formation, or for user specific beam forming, based on the user location information; and antenna directivity control parameter calculation that calculates the antenna directivity control parameter for the base station, based on a result of the user clustering process.

Figure 14:
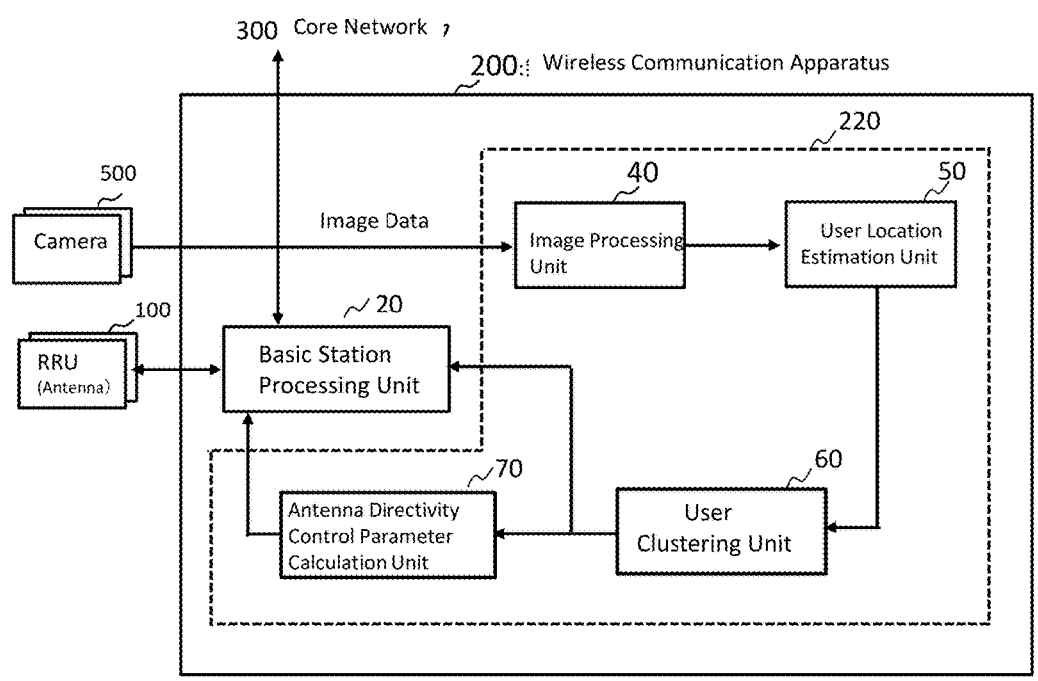
FIG. 14 is a diagram for explaining basic concepts of some embodiments of the present invention.

FIG. 14 is a diagram illustrating one of modes of the present invention. A wireless communication apparatus 200 includes an image processing unit 40 that performs detection of a target object such as a person and so forth, a user location estimation unit 50 that estimates a location of a user, a user clustering unit 60 that performs clustering of users, an antenna direction control parameter calculation unit 70, a base station processing unit 20.

The base station processing unit 20 executes processing for providing a base station function, though not limited thereto. The base station processing unit 20 may be connected to a plurality of remote radio unit apparatuses (Remote Radio Units: RRUs) 100. In this case, the base station is composed of the base station processing unit 20 and the RRUs 100 (antennas).

The image processing unit 40 receives image data from a camera 500 and performs person determination in the image by person detection, face authentication, crowd detection and the like. Note that the image data captured by the camera 500 may be transmitted to the wireless communication apparatus 200 by wired communication, or the camera 500 may function as a communication terminal to transmit image data via the RRU 100 (antenna) to the base station processing unit 20, from which the image data may be transferred to the image processing unit 40.

The user location estimation unit 50 estimates a spatial location of a terminal user (user) who is determined as a person in the image.

The user clustering unit 60 performs load balancing clustering for dynamic cell formation and multi-user clustering (orthogonal beam selection) for user specific beam forming.

When transmitting a cell related signal such as a cell control signal or a broadcast signal, the antenna directivity control parameter calculation unit 70 may calculate an antenna directivity control parameter based on a load balancing clustering result for dynamic cell formation and transmit the antenna directivity control parameter to the base station processing unit 20.

When performing spatially multiplexed transmission of user related data by individual beam forming (Multi-User MIMO), the antenna directivity control parameter calculation unit 70 may calculate an antenna directivity control parameter (orthogonal beam selection) based on a result of multi-user clustering and transmit the calculated parameter to the base station processing unit 20.

In FIG. 14, respective units (functions) 20, 40, 50, 60, and 70 are not limited to being integrally arranged in one apparatus (node), but may, as a matter of course, be distributed in several nodes that perform communicative connection.

For example, the image processing unit 40, the user location estimation unit 50, the user clustering unit 60, and the antenna directivity control parameter calculation unit 70 may constitute one apparatus (node) 220. This apparatus functions as an apparatus (antenna directivity control signal generating apparatus) 220 that generates an antenna directivity control signal (inclusive of, for example, clustering information) to provide the generated signal to the base station processing unit 20. In this case, in FIG. 14, the RRUs 100, the base station processing unit 20, and the antenna directivity control signal generating apparatus 220 constitute a wireless communication system. Alternatively, each unit (function) of 20, 40, 50, 60, and 70 in FIG. 14 may be distributed in an apparatus different from the above. Alternatively, the configuration may be such that the image processing unit 40 is externally provided, and resultant data externally image processed is stored in a memory or the like.

According to one of several modes of the present invention, the wireless communication apparatus 200 estimates location-related information of a user who is a terminal user, by image processing, and based on estimated location-related information, an antenna directivity control parameter may be calculated. Therefore, as compared with a method of detecting a user location by general antenna steering and a method of calculating a precoding weight by estimating a wireless transmission path (channel) to calculate a precoding weight by a matrix operation, it is possible to improve accuracy in antenna directivity control, while reducing a processing time and a calculation amount. That is, according to one of the several modes of the present invention, since a location of a user can be grasped, irrespective of a directivity of an antenna and a shape of a current cell, it is possible to calculate and select an antenna directivity control parameter, with a high performance, without complex calculation.

According to one of several modes of the present invention, when performing dynamic cell formation according to a distribution situation of user terminals, a load balancing clustering result for dynamic cell formation may be used. Thus, it is possible for the wireless communication apparatus 200 to select an appropriate cell shape without receiving a transmission path information (channel estimation value, or the like) on a plurality of base station cells from user terminals.

In addition, according to one of several modes of the present invention, spatially multiplexed transmission with user specific beam forming (Multi-User MIMO), may be performed based on a result of multi-user clustering for user specific beam forming (orthogonal beam selection). This makes it possible to simplify calculation of a precoding weight by complicated matrix operation.

Example embodiments of the present invention will now be described in detail with reference to the drawings.

The outline of the first and second embodiments described below will be explained.

In a first example embodiment, an example of a wireless communication apparatus for implementing antenna directivity control according to the present invention will be described. That is, a configuration, feature, and operation of a wireless communication apparatus including an image processing unit, a user location estimation unit, and a user clustering unit of the basic mode described with reference to FIG. 14 will be described in detail.

In the second example embodiment, an application example to a configuration that specifies a terminal ID candidate(s) of a detected target as a video monitoring system will be described.

First Example Embodiment

Figure 1:
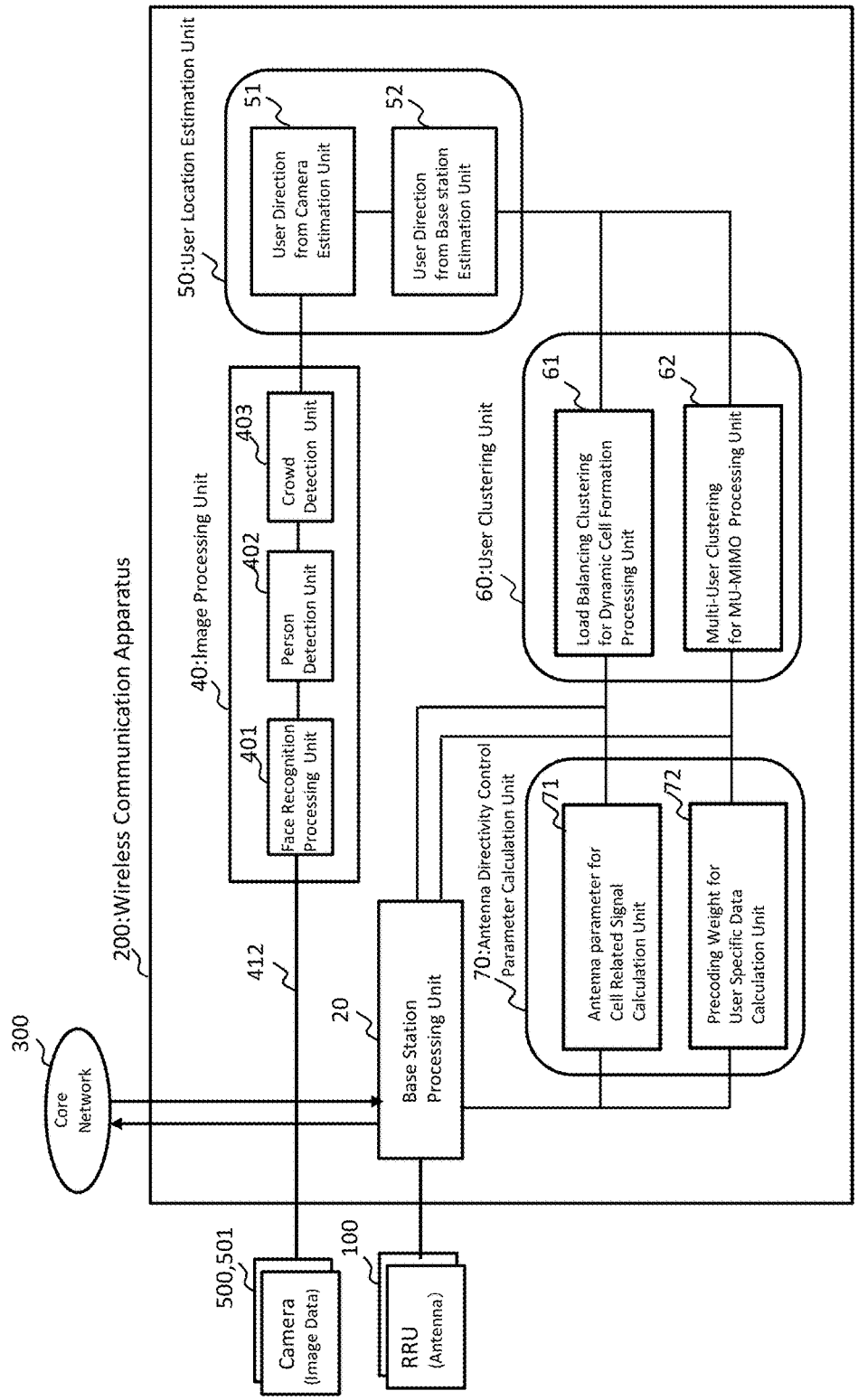
FIG. 1 is a diagram illustrating a configuration of a first example embodiment of the present invention.

FIG. 1 is a diagram illustrating a configuration of a first example embodiment. The wireless communication apparatus 200 includes a base station processing unit 20, an image processing unit 40, a user location estimation unit 50, a user clustering unit 60, and an antenna directivity control parameter calculation unit 70. By estimating user location using an image processing result, and performing user clustering, a desired antenna directivity control parameter is calculated. In the wireless communication apparatus 200, respective units 20, 40, 50, 60, and 70 may be arranged in one node (apparatus), or may be distributed in several nodes. For example, the image processing unit 40, the user location estimation unit 50, the user clustering unit 60, and the antenna directivity control parameter calculation unit 70 may be arranged in one node as an apparatus for generating an antenna directivity control parameter, wherein the node may transmit the antenna directivity control parameter and the user clustering information to the base station processing unit 20.

The user location estimation unit 50 estimates a location of a target object (a user of a wireless communication terminal), using a detection result of a person detected in the image processing unit 40.

The user clustering unit 60 performs dynamic cell formation or clustering for user specific beam forming, using a user location estimation result obtained by the user location estimation unit 50.

The antenna directivity control parameter calculation unit 70 calculates an antenna directivity control parameter based on a clustering result by the user clustering unit 60.

The wireless communication apparatus 200 may be configured as a C-RAN (Centralized-RAN (Radio Access Network), Cloud-RAN) which is an aggregated base station. Alternatively, the wireless communication apparatus 200 may be an integrated type (All-in-One type) base station configuration.

Here, the base station processing unit 20 performs Layer-1 (L1), Layer-2 (L2), Layer-3 (L3) processing, and the like of the base station processing based on OSI (Open Systems Interconnection) and is connected to the radio remote unit RRU (Remote Radio Unit) 100, on which an antenna, an RF (Radio Frequency) unit and the like are mounted. Of these, a physical layer (PHY) belonging to the L1 layer provides information transmission service to an upper layer using a physical channel. The PHY layer is also connected to a medium access control (MAC) layer of the L2 layer through a transport channel. The MAC layer of the L2 layer provides services such as resource allocation between a logical channel and a transport channel to a radio link control (RLC) layer through a logical channel. The RLC layer performs communication control to reduce packet transmission errors, for example. Besides the MAC layer and the RLC layer, the L2 layer has a packet data convergence protocol (PDCP) layer. The PDCP layer compresses header information added to a packet data and performs efficient transmission on a wireless link and packet ordering management. A radio resource control (RRC) layer of the L3 controls a transport channel and a physical channel in relation to, for example, setting, resetting, releasing, and the like of a radio bearer. The RRC layer performs broadcasting of system information (System Information Block: SIB) and call information (paging information) for a terminal, from a network, and controls radio resources between a terminal and a radio access network.

In a case of a C-RAN configuration, base station processing for a plurality of cells/sectors (RRUs 100) is performed in aggregation. It is noted that the Layer-1 processing of the base station processing may be performed by the base station processing unit 20, or may be performed on the RRU 100. Further, the base station processing unit 20 may perform processing of the Layer-3 and the RRU 100 may perform processing of the Layer-2 and Layer-1. Further, the base station processing unit 20 may perform processing of at least a part of the Layer-3 and Layer-2 (for example, PDCP layer), and each of the RRUs 100 may perform processing of at least part of the Layer-2 (for example, RLC layer and MAC layer). In addition, the base station processing may include processing in various layers that are used to communicate with a core network node (or core network function) and/or other base stations (other base station functions). For example, the base station processing may include processing in at least one of X2-AP (Application Protocol) and S1-AP (Application Protocol) specified by 3GPP. Here, X2 designates an I/F between base stations (eNB (eNode B)) specified by 3 GPP and S1 designates an I/F between a base station (eNB) specified by 3 GPP and an MME (Mobility Management Entity, one of the core network nodes).

The RRU 100 includes a RF (Radio Frequency) transceiver that includes frequency convertors for an up-conversion from an intermediate frequency (IF) to a radio frequency (RF) and for down-conversion of RF to IF, a power amplifier for power-amplifying a transmission signal, a duplexer for electrically separating a transmission path and a reception path in case wherein a transmission antenna and a reception antenna are shared by a single antenna, and an LNA (Low Noise Amplifier) for amplifying a signal received by the antenna). For example, between the RRU 100 and the baseband unit BBU (Base Band Unit) of the base station processing unit 20, a digital baseband signal may be transmitted by an optical fiber or the like.

An upper network side is connected to, for example, a core network 300 (Evolved Packet Core (EPC)) in the case of LTE).

In a case where the wireless communication apparatus 200 is configured as a C-RAN, the wireless communication apparatus 200 is configured to be connected to a plurality of RRUs 100 that are aggregated for processing. In a case where the wireless communication apparatus 200 is configured as an integrated base station, it is configured to be closely connected to a corresponding RRU.

The image processing unit 40 receives image data captured by the cameras 500 and 501. In FIG. 1, the camera 500 is illustrated as a configuration in which image data captured by the wireless communication apparatus 200 is directly transferred to the image processing unit 40 of the wireless communication apparatus 200. In this case, the camera 500 may be configured to transmit image data to the image processing unit 40 of the wireless communication apparatus 200 by wired communication or wireless communication. The camera 500 may wirelessly transmit, as a communication terminal, image data. On reception of the image by the RRU 100 (antenna), the image data may be forwarded from the base station processing unit 20 to the image processing unit 40. The RRU 100 may be compliant with the 3GPP standard such as LTE or may be adapted to a wireless LAN (Local Area Network).

The image processing unit 40 may include a face authentication processing unit 401 that performs face authentication processing, a person detection unit 402 that performs person detection, and a crowd detection unit 403 that detects a crowd. Alternatively, in order to detect person and user distribution, the image processing unit 40 may include any one or a combination of any one of the face authentication processing unit 401, the person detection unit 402, and the crowd detection unit 403, or further may include a unit for performing other processing if necessary.

The user location estimation unit 50 may include a user direction from camera estimation unit 51 and a user direction from base station estimation unit 52.

The user clustering unit 60 may include a load balancing clustering unit 61 for dynamic cell formation, for a case of performing dynamic cell formation. The user clustering unit 60 may include a multi-user clustering for MU-MIMO processing unit 62, for a case of performing user specific beam forming.

The antenna directivity control parameter calculation unit 70 may include an antenna parameter for cell related signal (dynamic cell formation) calculation unit 71 and a precoding weight for user specific data calculation unit 72.

Figure 2:
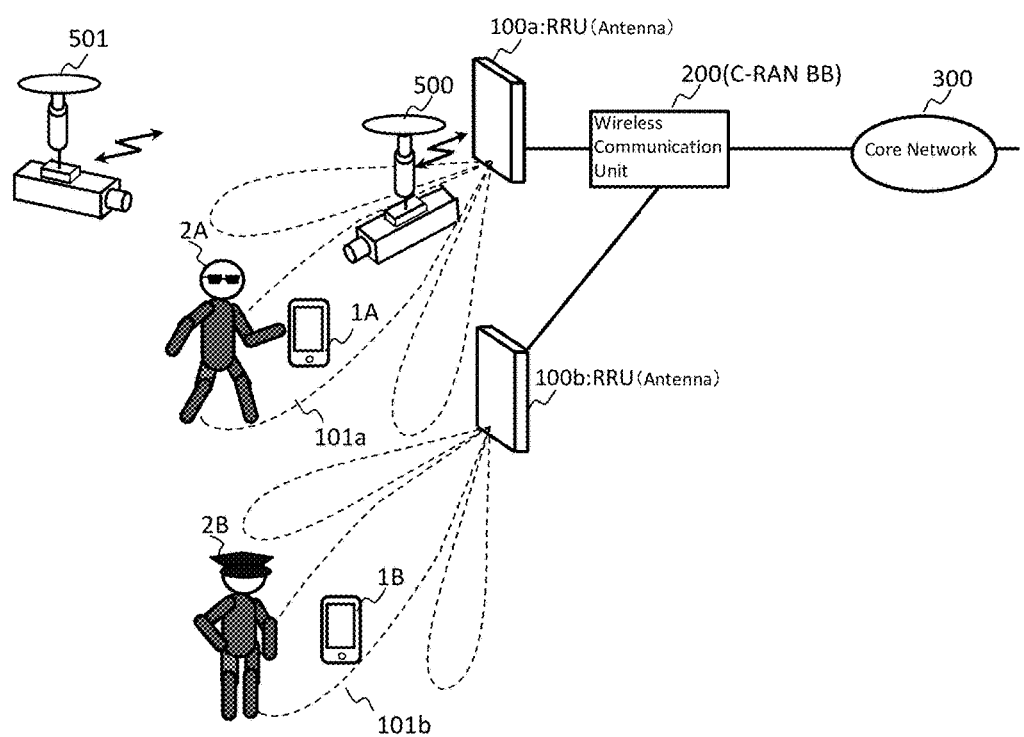
FIG. 2 is a diagram schematically illustrating a system environment of a first example embodiment of the present invention.

FIG. 2 is a diagram schematically illustrating an example of a system environment including the wireless communication apparatus 200 illustrated in FIG. 1.

The wireless communication apparatus 200 is connected to RRUs 100a and 100b, and an upper layer network side of the wireless communication apparatus 200 is connected to the core network 300. The cameras 500 and 501 capture image of a wireless communication area. The images captured by the cameras 500 and 501 are supplied to a system by wired communication or wireless communication via the RRUs 100a and 100b, or the like.

As an operation of the first example embodiment, wireless communication control of a plurality of RRUs 100 is aggregated using the wireless communication apparatus 200. Specifically, for example, the base station processing unit 20 performs the Layer-1, Layer-2, and Layer-3 processing of the base station processing, and the RRU 100 performs RF processing, or the like. It is noted that the Layer-1 processing of the base station may be performed on the RRU 100. Further, in FIG. 2, instead of a C-RAN configuration, an individual integrated base station configuration may, as a matter of course, be adopted.

Generally, uplink data (Uplink) from a terminal is received via the RRU 100, supplied to the wireless communication apparatus 200, and outputted to the core network 300 which is an upper network. Downlink data (Downlink)

is supplied from the core network 300 to the wireless communication apparatus 200, and is transmitted to the terminal via the RRU 100.

The cameras 500 and 501 may capture an image of a wireless communication area. Camera images of a video surveillance system or the like, which is IT processing, may also be utilized.

The image processing unit 40 performs, for example, face authentication processing, person detection processing, crowd detection processing, and so forth, on received video data.

For example, in general face authentication processing, by detecting a face from video data, extracting a feature amount, and collating the feature amount with face information registered in advance in a database (not shown) or the like, it is determined whether the feature amount matches the registered face information or not. In the present embodiment, a result obtained by up to the face detection processing, which is first processing of the face authentication processing, is used. Here, the face detection processing detects an area that can be determined as "face" from input image data. A detection result of a face is handled in the same way as a detection result by the person detection unit 402.

When a terminal user in a certain wireless communication area is detected by the face authentication processing, or the like by the image processing unit 40, the user location estimation unit 50 performs user location estimation processing in order to grasp a location of the user.

When a plurality of users are detected by the face authentication process, or the like in the image processing unit 40, the user location estimation unit 50 estimates a location of each of the plurality of users detected or a location as a crowd area.

In particular, when user specific beam forming is required, the user location estimation unit 50 estimates each user location.

When dynamic cell formation is required, the user location estimation section 50 may estimate a location of a crowd region detected by the image processing unit 40.

In the user location estimation unit 50, the target direction from camera estimation unit 51 estimates a direction in which a target object is present as viewed from the camera that has captured the image input to the image processing unit 40.

The target direction from camera estimation unit 51 stores in a storage unit (not shown), for example, location information (coordinate information, size, and so forth) of an area determined as "face" in the input image data; and ID (identification information) of the camera that has captured the image data.

When a face is detected by the face detection processing of the face authentication processing unit 401 of the image processing unit 40, the target direction from camera estimation unit 51 estimates direction and distance of a target object from the camera, based on the location information (coordinate information, size, and so forth) of the detected "face" area.

As a result, the target direction from camera estimation unit 51 can estimate a rough direction of the target based on the coordinate information.

Further, the target direction from camera estimation unit 51 may estimate the rough distance from a camera to a target object from coordinate information and size.

Next, from the ID of the camera that has captured the image data in which the user is photographed, the estimated target direction and distance information from the camera, the target direction from base station estimation unit 52 estimates, for example, base station cell/sector in which a target object is accommodated (served), and direction (angle and distance) of a target object from the RRU (antenna) 100 that forms the base station cell/sector.

As an example, location related information (including orientation and angle) of each camera and each RRU is stored in advance, based on locational relationship of RRUs 100*a* and 100*b*, and the cameras 500 and 501 that are illustrated in FIG. 2, and based on relative locational relationship between the RRUs and each camera, a base station cell/sector formed by which RRU 100, in which the target object is accommodated, and direction (angle and distance) of the target object viewed from the RRU, may be estimated.

If an target object is accommodated in an RRU installed at approximately the same location and angle as the camera that has captured the image data, as relationship between the RRU 100*a* and the camera 500 illustrated in FIG. 2, a target direction (angle and distance) from the camera, is substantially the same as a target direction (angle and distance) from the base station. Therefore, it is possible to simplify estimation processing in the target direction from base station estimation unit 52.

In a case where it is estimated that a target object is in an area (cell edge, or the like) that can communicate from a plurality of base station cells/sectors, the target direction from base station estimation unit 52 may estimate direction (angle and distance) of each of the plurality of base station cells/sectors.

When the user clustering unit 60 performs dynamic cell formation, the load balancing clustering for dynamic cell formation processing unit 61 performs load balancing clustering processing for dynamic cell formation.

Further, when the user clustering unit 60 performs user-specific beamforming (MU-MIMO), the multi-user clustering for MU-MIMO processing unit 62 performs multi-user clustering processing for MU-MIMO.

FIG. 3A and FIG. 3B are diagrams for explaining an example of load balancing clustering for dynamic cell formation by load balancing clustering for dynamic cell formation processing unit 61. FIG. 3A indicates an example in the case where a user is mapped to a default cell shape. FIG. 3B corresponds to an example in a case where a cell shape is dynamically changed by load balancing.

Figure 4:
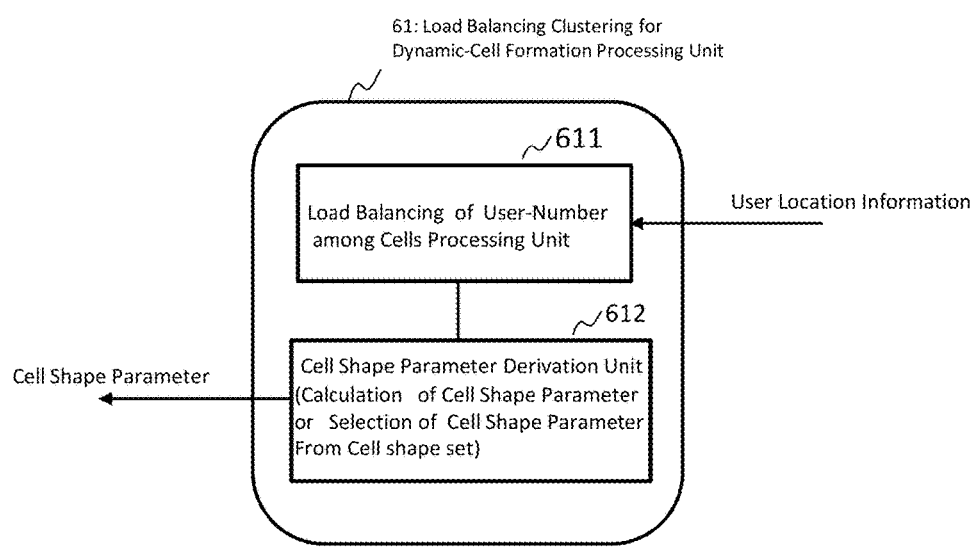
FIG. 4 is a diagram illustrating a load balancing clustering unit for dynamic cell formation according to a first example embodiment.

FIG. 4 is a diagram illustrating an example of a configuration of the load balancing clustering for dynamic cell formation processing unit 61. Referring to FIG. 4, the load balancing clustering for dynamic cell formation processing unit 61 includes a load balancing of user-number among cells processing unit 611 and a cell shape parameter derivation unit 612.

The load balancing of user-number among cells processing unit 611 detects the number of users among cells, based on location information of each user received from the user location estimation unit 50 and a default cell shape (FIG. 3A), the number of user terminals in each cell/sector. The number of user terminals in a cell/sector may be the number of user terminals 1 that are communicatively connected (for example, in an RRC (Radio Resource Control) connected state (RRC Connected)) to the base station processing unit 20 via the RRU 100 corresponding to the cell/sector. In FIG. 3A, FIG. 3B, and so forth, when reference is made without distinction among terminals 1A, 1B and so forth, a reference is made as a terminal 1 by using the representative reference number 1.

Based on the number of user terminals in a cell/sector detected by the load balancing of user-number among cells processing unit 611, when a load of the cell/sector is remarkably high, a cell shape parameter is dynamically changed as illustrated in FIG. 3B by the cell shape parameter derivation unit 612 from the calculation of a cell shape parameter or a cell shape set so that loads among neighboring cells can be balanced. That a load on a cell/sector is high indicates such a case in which a plurality of user terminals are closely packed in a certain cell/sector and a load exceeds a predetermined threshold with respect to a cell/sector capacity. In FIG. 3B, an original cell shape of the RRU 100a in FIG. 3A is changed so as to enlarge the cell so as to narrow the original cell shape of the RRU 100b in FIG. 3A. As a result, terminals 1D and 1E in the cell of the RRU 100b are managed as terminals under a cell of the RRU 100a that has changed a cell shape thereof.

The cell shape parameter derivation unit 612 may calculate an optimum cell shape parameter so as to include only an accommodated user(s) from user location related information or the like. Alternatively, a cell shape parameter set may be stored in advance in a storage unit (not shown), and a cell shape set in which load balancing is performed as efficiently as possible may be selected with each user being accommodated in one of cells/sectors. For example, with an arrangement in which a cell shape parameter is selected from the cell shape set held in advance in a storage unit (not shown), the calculation can be simplified, and a calculation amount can be reduced.

A cell shape parameter output from the cell shape parameter derivation unit 612 may include, for example, a direction of a central angular location from the RRU (antenna) 100, an angular spread, a cell/sector radius value, and the like.

Figure 5:
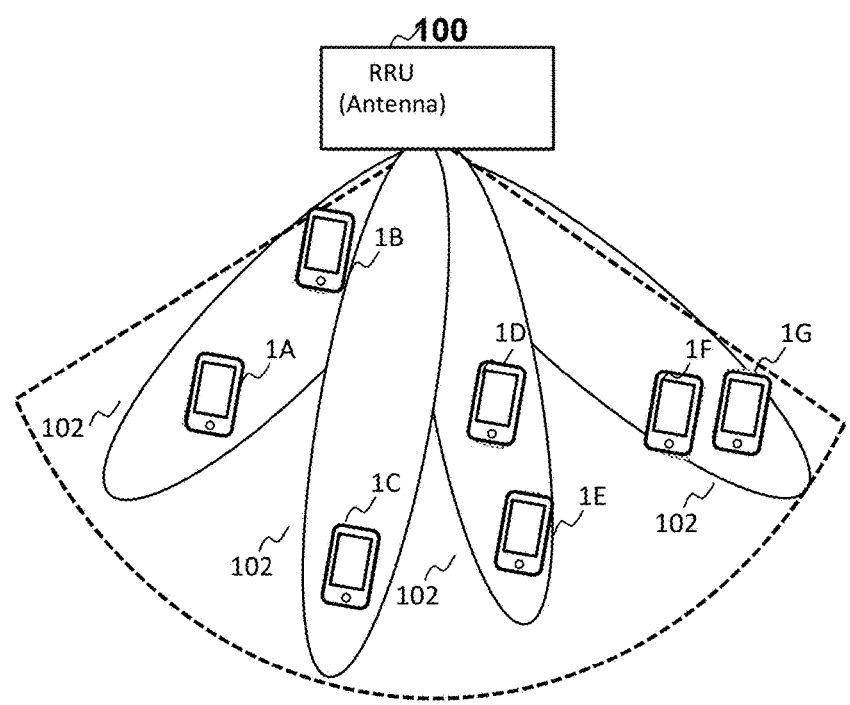
FIG. 5 illustrates multi-user clustering for MU-MIMO in a first example embodiment.

FIG. 5 is a diagram for explaining an example of multi-user clustering for user specific beam forming (MU-MIMO). In FIG. 5, a reference numeral 102 designates a beam.

Figure 6:
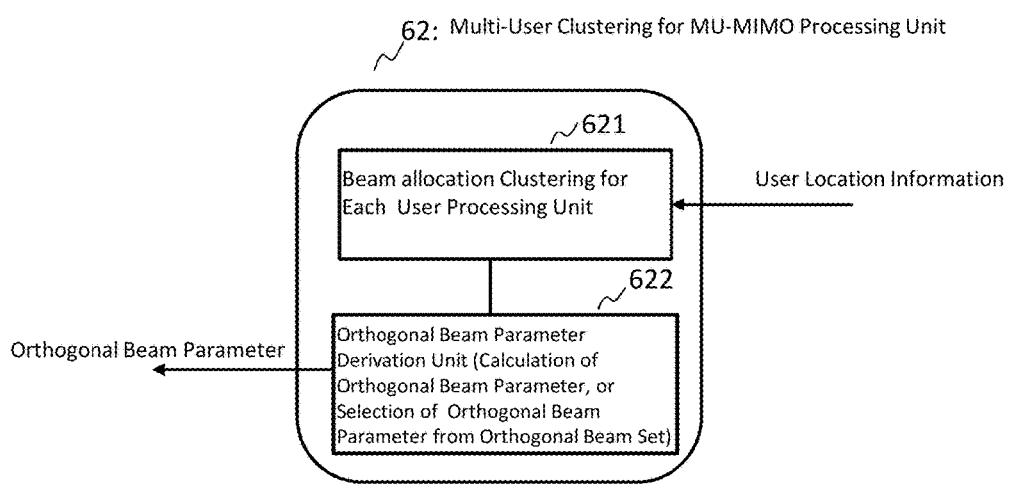
FIG. 6 is a diagram illustrating a multi-user clustering unit for MU-MIMO in a first example embodiment.

FIG. 6 is a diagram illustrating a configuration of the multi-user clustering for MU-MIMO processing unit 62. The multi-user clustering for MU-MIMO processing unit 62 includes a beam allocation clustering for each user processing unit 621 and an orthogonal beam parameter derivation unit 622.

In user specific beam forming, in order to transmit and receive user specific data spatially multiplexed by using a multi-element antenna (Massive MIMO), or the like, orthogonal beams are formed for each user to be multiplexed.

As illustrated in FIG. 5, in the multi-user clustering for MU-MIMO processing unit 62, based on location information of each user received from the user location estimation unit 50 and a maximum possible multiplex number, clustering of beam allocation of each user is performed so that each user can be separated by an orthogonal beam.

When the number of users in a cell/sector is smaller than the maximum possible multiplex number, the beam allocation clustering for each user processing unit 21 performs clustering of beam allocation so that a beam is allocated to each user one by one. The orthogonal beam parameter derivation unit 622 may calculate an orthogonal beam parameter or select the orthogonal beam parameter from a storage unit (not shown) that stores a set of orthogonal beam parameters.

The multi-user clustering for MU-MIMO processing unit 62 may performs clustering and beam formation so as to map a plurality of terminals to one beam, in a case such as, when it is difficult to allocate a beam orthogonal to each user, or, when the number of users in a cell/sector is larger than the predetermined maximum possible multiplex number. For example, in FIG. 5, one beam 102 is allocated to each of a cluster including a plurality of terminals 1A and 1B, a cluster including terminals 1D and 1E, and a cluster including terminals 1F and 1G, respectively. Further, a user group (crowd) detected by the crowd detection unit 403 may be mapped to one cluster.

The orthogonal beam parameter derivation unit 622 may calculate an orthogonal beam parameter, or, may store a set of orthogonal beam parameters in a storage unit in advance to select an orthogonal beam in order from among the set of orthogonal beam parameters. The orthogonal beam parameter derivation unit 622 allocates the beam to a user.

Referring again to FIG. 1, when dynamic cell formation (cell virtualization) is being performed, the antenna directivity control parameter calculation unit 70, when transmitting and receiving a cell related signal, such as a cell control signal or broadcast information, the antenna parameter for cell related signal calculation unit 71 may calculate an antenna directivity control parameter using a cell shape parameter (for example, a center angle, an angular spread, a cell radius, and the like) received from the load balancing clustering for dynamic cell formation processing unit 61.

In the antenna directivity control parameter calculation unit 70, when transmitting and receiving a cell related signal, by using the antenna directivity control parameter, it is possible to realize load balancing by dynamic cell formation (cell virtualization) as described with reference to FIG. 3A and FIG. 3B.

In the antenna directivity control parameter calculation unit 70, when transmitting and receiving user specific data by applying user specific beam forming (MU-MIMO), the precoding weight for user specific data calculation unit 72 calculates an antenna directivity control parameter (precoding weight), by using the orthogonal beam parameter received from the multi-user clustering for MU-MIMO processing unit 62.

The precoding weight for user specific data calculation unit 72 may be combined with a general method of user specific beam forming. A general method of user specific beam forming, includes, for example, based on CSI (Channel State Information) fed back from each user terminal, calculating a transmission coefficient matrix H (Channel matrix) of MIMO channels formed between antennas of a base station and antennas of a terminal, and calculating a precoding weight (precoding matrix) so that a reception strength becomes maximum at the user terminal and becomes null at other user terminals, by using beam forming technology.

For example, in a general method of user specific beam forming, when orthogonal beam forming vectors are to be solved based on calculation of a channel matrix by an iterative method or the like, as an initial vector of an iteration, an orthogonal beam parameter received the user clustering for MU-MIMO processing unit 62 may be used. As a result, the number of iterations in the iterative method can be reduced and convergence can be accelerated. As a result, in MU-MIMO, when transmitting and receiving user specific data by multiplexing, by performing the data transmission/reception by applying the precoding weight, the user specific beam forming (MU-MIMO transmission) illustrated in FIG. 5 may be implemented.

In general beamforming, for example, channel data is calculated so that a beamforming channel gain is maximized with respect to an effective channel matrix H between a transmitter and a receiver. For example, the following equation may be used.

$$(u,v)=\mathrm{argmax}|u^H H v|,$$

$$\|u\|=\|v\|=1$$

That is, beamforming weights v, and u (each norm of which is normalized to 1) on a transmitting side and a receiving side maximizing a gain $|u^H H v|$ of a beamforming channel are obtained. The beam forming weights v and u may be normalized beam forming vectors on the transmitting side and the receiving side, respectively. In an example of the iterative method, for example, it has a step 1 of determining the following reception vector (reception weight) and a step 2 of determining a transmission vector (transmission weight). That is, $$u(i)=\mathrm{norm}(Hv(i)) \quad \text{Step 1:}$$

$$v(i+1)=\mathrm{norm}(H^H u(i)) \quad \text{Step 2:}$$

where norm (x), $x/\|x\|$.

The beam forming vector on the transmission side that realizes a desired signal quality (for example, SNR (Signal to Noise Ratio)) is determined for each channel. H on an each shoulder of the beam forming vector u and the channel matrix H is an Hermitian operator (transpose/complex conjugate).

As described above, in the first example embodiment, the wireless communication apparatus 200 estimates a location of a user of a terminal by image processing, and based on the estimated location related information, calculates an antenna directivity control parameter. With such a configuration, compared with a method of detecting a user location by general antenna steering and a method of calculating a precoding weight by estimating a wireless transmission path (channel) and calculating a precoding weight, it is possible to obtain antenna directivity control parameters with higher accuracy while reducing a processing time and a calculation amount.

That is, according to the first example embodiment, it is possible to grasp a location of a user terminal irrespective of an antenna directivity or a shape of a current cell. Therefore, it is possible to derive an antenna directivity control parameter with high performance without requiring complicated calculation, for example, by selecting an orthogonal beam set.

Further, according to the first example embodiment, when forming a dynamic cell according to a user distribution, by using a result of load balancing clustering for dynamic cell formation, it is possible to select an appropriate cell shape without receiving, from a user terminal, propagation path information (channel estimation value, or the like) on a plurality of base station cells.

Furthermore, according to the first example embodiment, by performing spatially multiplexed transmission by user-specific beam forming (Multi-User MIMO), based on a result of multi-user clustering (selection of orthogonal beam parameters) for user specific beam forming, it is possible to simplify calculation of the precoding weight by complicated matrix calculation.

Second Example Embodiment

Figure 7:
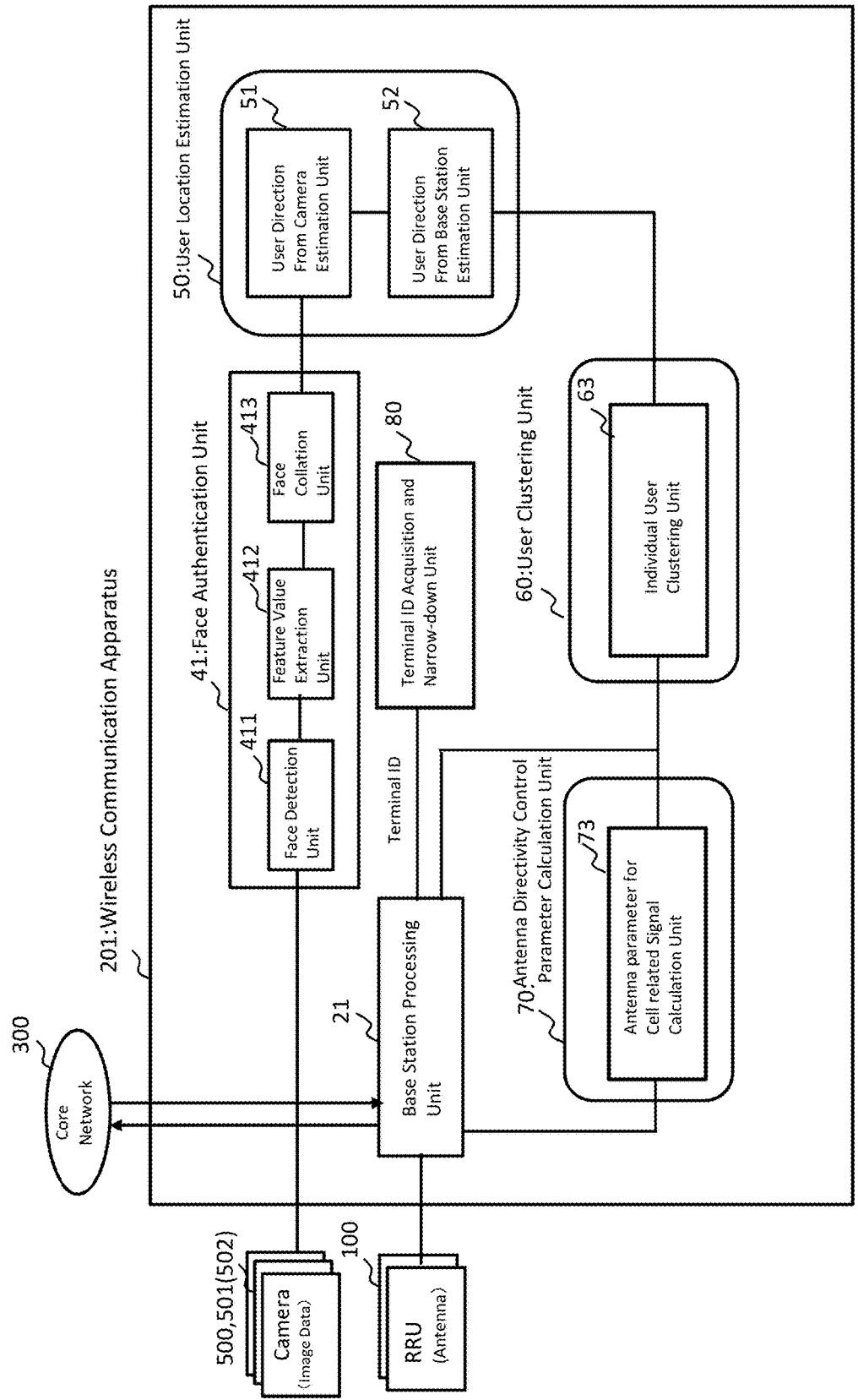
FIG. 7 is a diagram illustrating a configuration of a second example embodiment of the present invention.

FIG. 7 is a diagram illustrating a configuration of a second example embodiment of the present invention. In the second example embodiment, a wireless communication apparatus performs a process of identifying a terminal ID candidate of a target object detected in image data.

Referring to FIG. 7, a wireless communication apparatus 201 includes a base station processing unit 21, a face authentication unit 41, a user location estimation unit 50, a user clustering unit 60, an antenna directivity control parameter calculation unit 70, a terminal ID acquisition and a narrow-down unit 80. The base station processing unit 21 is the same as the base station processing unit 20 of FIG. 1 that is referred to in the first example embodiment.

The face authentication unit 41 corresponds to the image processing unit 40 in FIG. 1. The face authentication unit 41 detects whether a face detected in monitoring image data that is received from the cameras 500, 501 (502), matches face information registered in a database (not shown) in advance. The face authentication unit 41 includes a face detection unit 411, a feature amount extraction unit 412, and a face collation unit 413.

The user location estimation unit 50 estimates a location of an object by using a result detected by the face authentication unit 41.

The user clustering unit 60 performs user specific clustering for antenna directivity control using a result of the user location estimation.

The antenna directivity control parameter calculation unit 70 calculates an antenna directivity control parameter based on the clustering result.

The terminal ID acquisition and narrow-down control unit 80 narrows down terminal IDs acquired by antenna directivity control.

As with the first example embodiment, the base station processing unit 21 performs the Layer-1, Layer-2, Layer 3 processing and the like of base station processing and is connected to the RRU 100 on which an antenna, an RF unit and the like are mounted. The base station processing unit 21 is connected to a core network 300, for example, on a host network side.

In a case where the wireless communication apparatus 201 is configured as a C-RAN, the wireless communication apparatus 201 is connected to a plurality of RRUs 100 that are aggregated for processing. When the wireless communication apparatus 201 has an integrated base station configuration, the wireless communication apparatus 201 is closely connected to a corresponding RRU.

As illustrated in FIG. 7, the user location estimation section 50 may include a target direction from camera estimation unit 51 and a target direction from base station estimating unit 52.

The user clustering unit 60 includes a user specific clustering unit 63 for terminal ID detection.

The antenna directivity control parameter calculation unit 70 includes an antenna parameter for cell related signal calculation unit 73.

Figure 8:
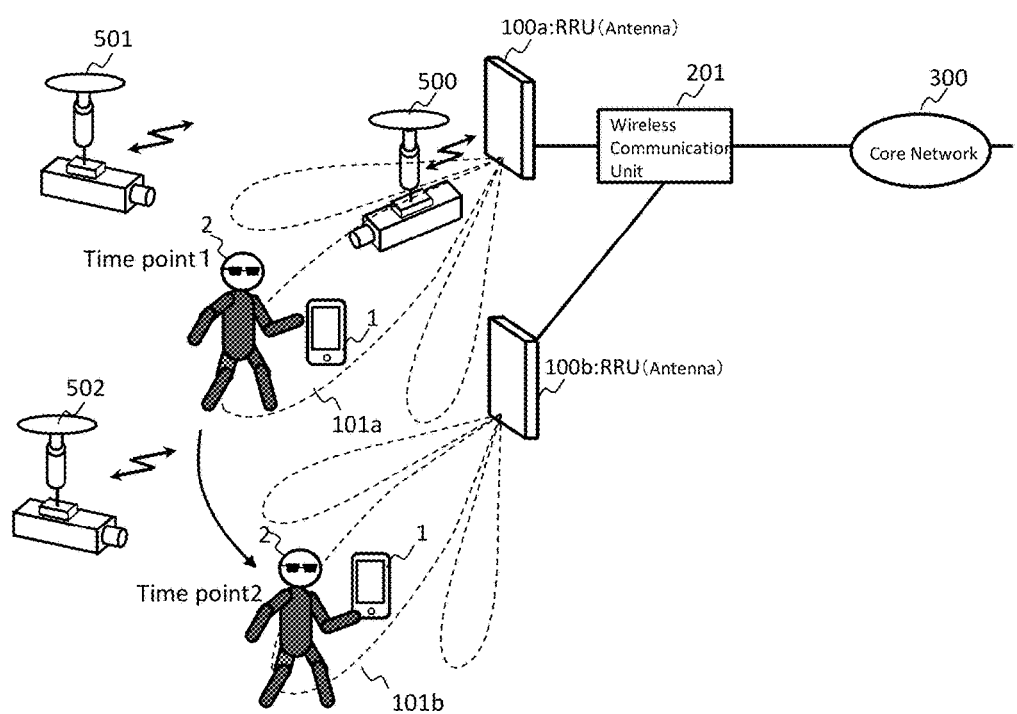
FIG. 8 is a diagram schematically illustrating a system environment according to a second example embodiment of the present invention.

FIG. 8 is a diagram schematically illustrating a system including a wireless communication apparatus 201 illustrated in FIG. 7. Basically, the system is similar to a system environment of the first example embodiment illustrated in FIG. 2. As will be described in detail later, a target object (2) is detected in a cell/sector of RRU 100a at time 1, and the target object (2) is detected in a cell/sector of RRU 100b at different time 2.

The operation of the second example embodiment will be described. First, similarly to the first example embodiment, the wireless communication apparatus 201 in the second example embodiment aggregates radio communication control of a plurality of RRUs 100 into the base station processing unit 21. In general, uplink data (Uplink) is received from the terminal 1 via the RRU 100, is supplied to the wireless communication apparatus 201, and is output to the core network 300 which is an upper network. Downlink data (Downlink) is supplied from the core network 300 to the wireless communication apparatus 201, and is transmitted to a terminal (not shown) via the RRU 100.

In the second example embodiment, image monitoring control may be realized by edge processing (edge computing) integrated with the wireless communication apparatus. In edge computing, servers ("edge servers"), or the like, are distributed close to a user, and a communication delay is shortened by reducing a distance. It is noted that an edge server may be connected to a base station apparatus or may be connected to a node (for example, MME (Mobility Management Entity) or the like) of a core network.

In this case, as a communication interface of image data supplied from a camera for video monitoring, a wired connection interface as illustrated in FIG. 7 may be used, or wireless connection via the RRU 100 or the like, may be performed, and may be redirected from the base station processing unit 21 to the face authentication unit 41, instead of the core network 300.

At this time, in order to make a data interface (I/F) as seen from the face authentication unit 41 become a general data I/F, part of the function of the core network 300 (EPC (Evolved Packet Core) function such as S-GW (Serving Gateway)/P-GW (PDN (Packet Data Network) Gateway)) may be mounted in the wireless communication apparatus 201.

Reception data not related to processing of the face authentication unit 41 for monitoring control or the like is output to the core network 300.

The face authentication unit 41 includes a face detection unit 411, a feature amount extraction unit 412, and a face collation unit 413. The face authentication unit 41 performs, for example, face detection processing, feature amount extraction processing, face collation processing, and the like, in order, from the input image data and performs face authentication processing in which calculates a score based on a degree of similarity of a feature amount between a portion detected as a face and face information registered in advance in a database (not shown), and determines whether or not the score satisfies a reference value.

Here, the face detection processing detects an area that can be determined as a "face" from the input image data. For example, a rectangular region matching a face is extracted by searching a rectangular region in order from an edge of the image, and the rectangular region is identified to be a face or a non-face.

The feature amount extracting processing extracts a feature amount that specifies an individual from the face information determined as "face" by the face detection processing. For example, locations of feature points such as a pupil center, a nose wing, and a mouth end are searched from a face rectangular area.

In the face matching processing, by matching a feature amount of a "face" detected in the image data with a feature amount of face information registered in the database (collation of similarity), it is possible to detect whether a "face" registered in the database exists or not. In the processing of the face authentication unit 41, a portion considered as a face is extracted from an image and compared with a face image database to perform identification. For example, the face authentication unit 41 may be implemented with arbitrary commercialized face authentication software.

For example, face information of past criminals and cautioning persons is registered in a database (not shown) in advance. When it is determined that a person imaged by the camera 500 or the like is a past criminal or a cautionary person registered in the database in advance, the person can be recognized (to the user) as a past criminal or a caution person. Thus, a suspicious person monitoring system can be realized. The database may be provided in the wireless communication apparatus 200 or may be configured such that the face authentication section 41 of the wireless communication apparatus 200 is connected via communication means.

Also, by registering face information such as VIP (Very Important Person), registrant, lost child, or the like, it is possible to detect presence of each and can realize services such as VIP special service and lost child search. Although not particularly limited, as an example of the VIP special service, for example, it is possible to provide a service that enables a person registered in advance as VIP treatment to enter a facial pass without requiring an entrance (admission) procedure, or the like.

When a certain object is detected by the face authentication section 41, in order to acquire a terminal ID candidate of the object which is determined to match a face image registered in a database (not shown) (which may be provided in the face authentication section 41 or may be provided outside the face authentication section 41), the target direction from camera estimation unit 51 calculates a direction from the direction of a camera (not shown) or the like, that has captured the received image data, estimate a direction in which the object exists.

For example, the target direction from camera estimation unit 51 acquires location information (coordinate information, size, and the like) of a region determined as a "face" in the input image data and ID of the camera that captured the image information) are stored in a storage unit (not shown). When a target object is detected by processing in the face collation unit 413, direction and distance of the target object from the camera may be estimated, based on location information (coordinate information, size, and the like) of the detected "face" region.

The target direction from camera estimation unit 51 can estimate a course direction of the target from the coordinate information of the detected "face" region.

Further, the target direction from camera estimation unit 51 may estimate a course distance to the target, based on the coordinate information and the size of the detected "face" region.

Next, the target direction from base station estimation unit 52 estimates location related information of a target from an ID of the camera which captured image including the target object, direction and distance information of the target object from the estimated camera.

The location related information estimated by the target direction from base station estimation unit 52 includes, for example, in which base station cells/sectors the target object is accommodated, direction (angle and distance) of the target object from the RRU (antenna) 100 forming the base station cell/sector.

For example, the location related information (including orientation and angle) of each camera and each RRU is in advance stored in a storage unit (not shown), based on the locational relationship between the RRUs 100*a* and 100*b* and the cameras 500 and 501 as illustrated in FIG. 8.

Based on relative locational relationship between each camera and the RRU, the target direction from base station estimation unit 52, may estimate:

in which base station cell/sector formed by which RRU 100 a target is accommodated, direction (angle and distance) of a target object viewed from the RRU.

In a case where a target object is accommodated in an RRU (for example, a camera integrated type base station) installed at substantially the same location and angle as the camera 500 that captured the image, as in the relationship between the RRU 100a and the camera 500, as illustrated in FIG. 8, a target direction (angle and distance) from the camera and a target direction (angle and distance) from the base station are almost the same.

Thus, in the target direction from base station estimation unit 52, the processing of estimating direction of a target object from the RRU 100a is simplified.

When it is estimated that a target object is located in an area (for example, an edge of a cell or the like) communicable from a plurality of cells/sectors, a direction (angle and distance) of the target object for each of the plurality of cells/sectors may be estimated.

Referring again to FIG. 7, in the user specific clustering unit 63 of the user clustering unit 60, when detecting a target terminal ID using antenna directivity control, the user specific clustering processing is performed.

Figure 9:
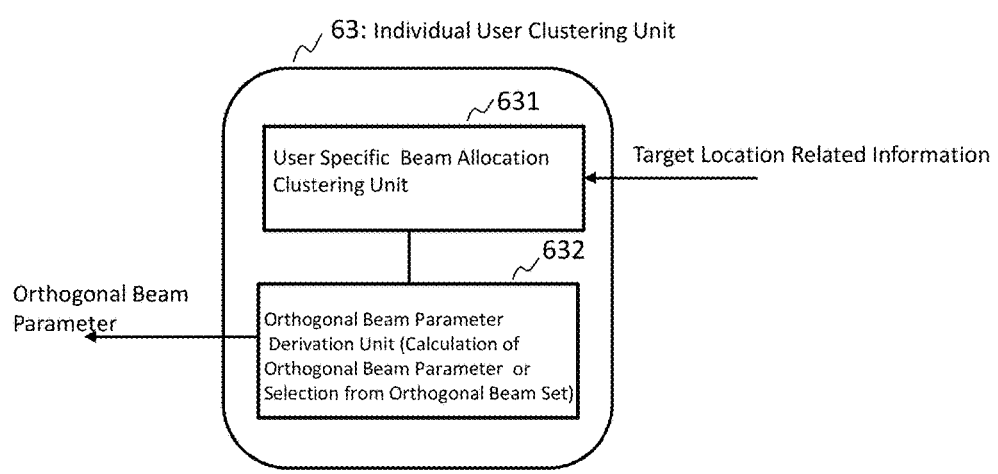
FIG. 9 is a diagram illustrating a user individual clustering unit in the first example embodiment.

FIG. 9 illustrates a configuration of the user specific clustering unit 63. FIG. 10 is a diagram for explaining user specific clustering processing. The user specific clustering unit 63 includes a user specific beam allocation clustering unit 631 that performs beam allocation clustering processing for each user, an orthogonal beam parameter derivation unit 632 that calculates an orthogonal beam parameter, or selects a beam parameter from an orthogonal beam parameter set stored in advance in a storage unit.

In order to detect a terminal ID by performing antenna directivity control (beamforming) from target object's location related information by using a multi-element antenna (Massive MIMO), or the like, it is necessary to form a beam directed to a range as narrow as possible that includes a location of a target object.

The user specific beam allocation clustering unit 631 performs clustering so that a target object can be separated by orthogonal beams, based on the target object's location related information received from the user location estimation unit 50.

As the orthogonal beam parameter derived by the orthogonal beam parameter derivation unit 632, similarly to the multi-user clustering for MU-MIMO processing unit 62 of the first example embodiment, orthogonal beam sets may be stored in advance and a method of selecting the most appropriate beam from among the orthogonal beam sets may be used.

Referring again to FIG. 7, in the antenna directivity control parameter calculation unit 70, the antenna-parameter for cell related information calculation unit 73 calculates the antenna directivity control parameter (precoding weight) using the orthogonal beam parameter received from the user specific clustering unit 63.

In cooperation with the antenna directivity control parameter calculation unit 70, the base station processing unit 21 controls antenna directivity of the RRU 100 and communicates with a terminal in a base station cell/sector to detect a terminal ID candidate.

As a method for detecting the terminal ID by controlling the antenna directivity, for example, a method using reception antenna directivity control in uplink, a method using transmission antenna directivity control in downlink, or the like may be used.

Figure 10A:
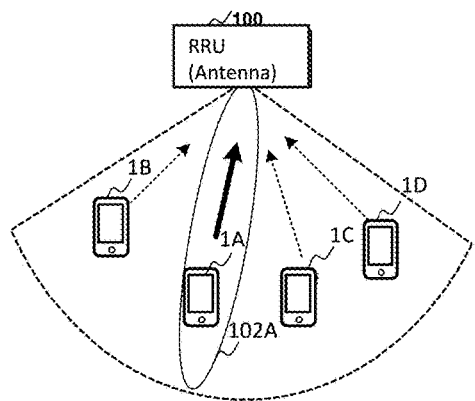
FIG. 10A and FIG. 10B are diagrams for explaining user individual clustering in the first example embodiment.
Figure 10B:
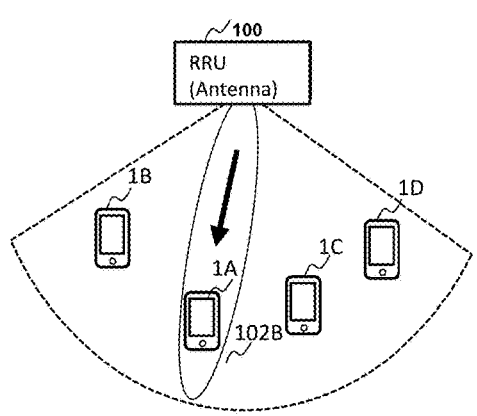

FIG. 10A schematically illustrates an example of a case in which directivity control of a reception antenna in used in an uplink. FIG. 10B schematically illustrates an example of a case in which directivity control of a transmission antenna in used in a downlink. 102A and 102B designate beams (user specific beams).

Figure 11:
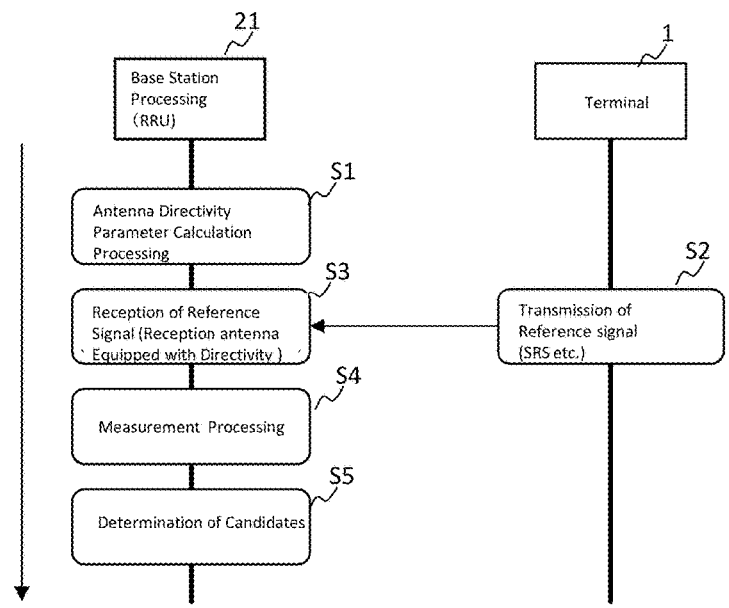
FIG. 11 is a diagram for explaining an example of terminal ID detection by reception antenna directivity control in a second example embodiment.

FIG. 11 is a diagram exemplifying an example of a processing flow in a case where reception antenna directivity control is used in an uplink in the present embodiment.

In the case in which the reception antenna directivity control is used in an uplink, the antenna directivity control parameter calculation unit 70 calculates an antenna directivity control parameter based on received locational relationship information of a target object (step S1).

Then, the base station processing unit 21 receives the antenna directivity control parameter calculated by the antenna directivity control parameter calculation unit 70, and performs reception antenna directivity control on the RRU 100 side, by using the antenna directivity control parameter.

All the terminals in the RRU (cell/sector) to the RRU 100 are made to transmit SRS (Sounding Reference Signal) signals, or the like to the RRU 100 (step S2).

The RRU 100 receives the reference signal (SRS, or the like) transmitted from the terminal 1 (step S3). The RRU 100 transmits the received reference signal to the base station processing unit 21.

The base station processing unit 21 performs signal measurement processing (measurement and the like) of the received reference signal (step S4).

The base station processing unit 21 detects candidate terminals based on the measurement result (step S5).

By using a directional antenna of the RRU 100, a signal from the terminal 1 (see FIG. 10 A) to which the antenna is directed is strongly received and a signal from the terminal not facing the antenna is weakened.

Figure 12:
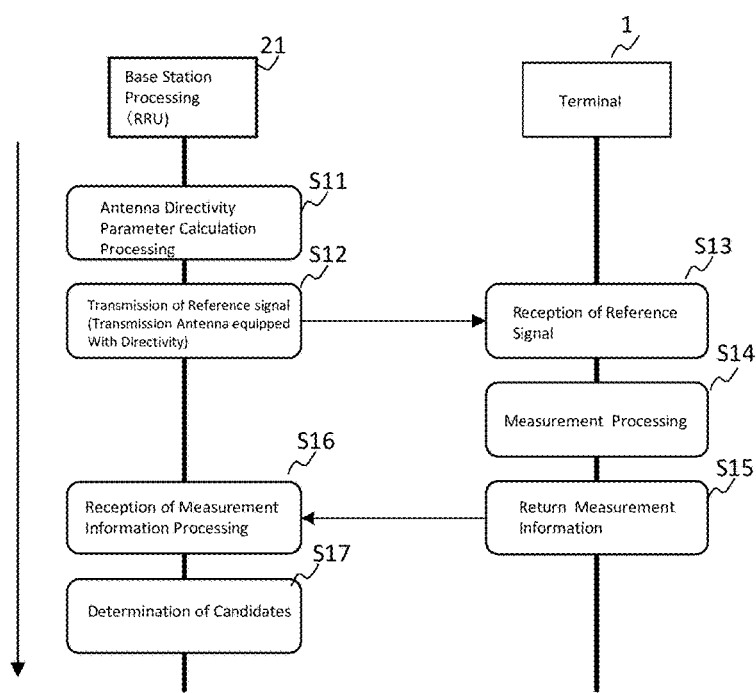
FIG. 12 is a diagram for explaining an example of terminal ID detection by transmission antenna directivity control in a second example embodiment.

FIG. 12 is a diagram illustrating an example of a processing flow in the case in which transmission antenna directivity control is used in a downlink.

Even when the transmission antenna directivity control in the downlink is used, first, the antenna directivity control parameter calculation unit 70 calculates an antenna directivity control parameter based on the received locational relationship information of a target object (step S11).

Then, the base station processing unit 21 receives the antenna directivity control parameter calculated by the antenna directivity control parameter calculation unit 70, performs transmission antenna directivity control of the RRU 100 using the antenna directivity control parameter, and then transmits from the RRU a reference signal (CRS (Common Reference Signal) or the like) (step S12).

The reference signal (CRS or the like) from the RRU 100 is received by all the terminals 1 served by the RRU (cell/sector) (step S13).

The terminal 1 performs signal measurement of the reference signal (step S14).

The terminal 1 returns the signal measurement result (measurement information) of the reference signal to the base station processing unit 21 via the RRU 100 (step S15).

The base station processing unit 21 receives the signal measurement result (measurement information) transmitted from the terminal 1 (step S16).

Based on the signal measurement result transmitted from the terminal 1, the base station processing unit 21 detects a candidate terminal ID (step S17).

A fact is utilized that with transmission by a directional antenna of the RRU 100, a signal can be strongly received at a terminal to which the antenna is directed, while a signal power is weakened at a terminal to which the antenna is not directed.

Then, the terminal ID detection/refinement control unit 80 sets a terminal that exceeds a certain condition or threshold value as a candidate of a detected terminal, and sets ID information of one or more candidate terminals as terminal ID candidate information.

As with the first example embodiment, for example,

IP (Internet Protocol) address information of a terminal,

Subscriber Identity Module (SIM) card information inserted in a terminal,

Terminal model information,

Phone number,

Unique information such as serial number of a terminal,

Bearer information (Bearer ID) (for example, bearer information of a radio access bearer (RAB) between a terminal and a base station and bearer information of a PDN (Packet Data Network) connection)

TEID (Tunnel Endpoint Identifier) (tunnel identifier of GPS (GPRS Tunnelling protocol) tunnel), C-RNTI (Cell-Radio Network Temporary Identifier) information, IMSI (International Mobile Subscriber Identity), TMSI (Temporary Mobile Subscriber Identity), and the like, or a combination of at least one of them, or the like, may be used as the terminal ID information. IMSI is a unique identification number assigned to a mobile phone user. Randomly generated TMSI is transmitted instead of IMSI so that calls cannot be identified by eavesdropping or the like.

Here, in the terminal ID acquisition and narrow-down unit 80, when a plurality of terminal ID candidates are detected and further narrowing down of the terminal ID candidates among the terminal ID candidates is required, terminal ID acquisition and narrow-down unit 80 ID narrowing down may be performed.

As a first method of narrowing down the terminal IDs, narrowing down is performed using temporal/spatial ID candidate information at a plurality of detection points.

As examples of a plurality of detection points, for example, terminal ID candidate information acquired at a plurality of base station cells/sectors at the same time, terminal ID candidate information acquired at a plurality of different times, or the like may be used.

The terminal ID acquisition and narrow-down unit 80 may collate these items of terminal ID candidate information to narrow down the terminal ID candidates.

As a second method of narrowing down the terminal IDs, terminal ID information that is previously known as "being not a target object" is registered as a whitelist in a storage unit (not shown), and the detected terminal ID candidate The terminal ID candidates registered as the whitelist are excluded from the detected terminal ID candidates, thereby narrowing down the terminal ID candidates.

As illustrated in FIG. 8, for example, the terminal ID candidates detected by the RRUs 100a and 100b at the same time 1 and the terminal ID candidates detected by the RRU 100b at a different time 2 are cooperated to narrow down the terminal ID candidates.

Figure 13:
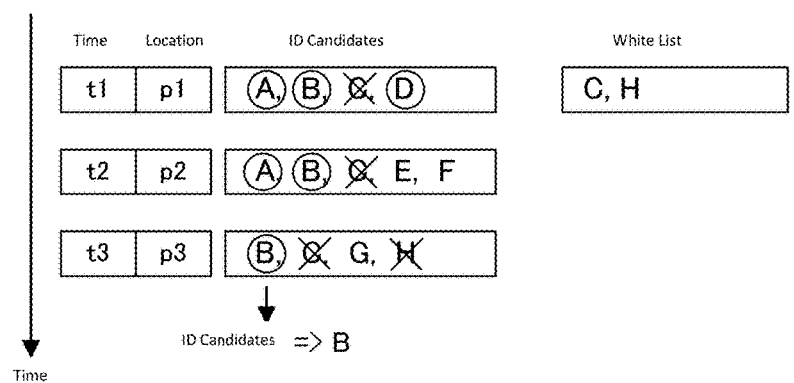
FIG. 13 is a diagram illustrating an example of a narrowing down method according to a second example embodiment.

FIG. 13 is a diagram for explaining an example of a method of narrowing down terminal IDs by combining both the first method and the second method of narrowing down as described above.

For example, it is assumed that terminal ID candidates A, B, C, and D are detected at time t1 and location (=base station cell/sector) p1, similarly, terminal ID candidates A, B, C, E, and F are detected at time t2 and location p2, and terminal ID candidates B, C, G, and H are detected at time t3 and location p3.

It is also assumed that C and H are registered in the whitelist as terminal IDs that have already been known not to be a target object.

Here, a relationship between time and place may be either a case of a plurality of base station cells/sectors at the same time (for example, it is presumed that there is a target object in a cell edge), or a case of the same base station cell/sector at different time points.

Further, the relationship between time and place may include a case where time and place are both different.

In the case of the example of FIG. 13, the terminal C is excluded from the terminal ID candidates of (time, place)= (t1, p1) by the terminal ID acquisition and narrow-down unit 80) (indicated by "x").

Next, the terminal ID acquisition and narrow-down unit 80 narrows down the terminal ID candidates in cooperation with (time, place)=(t2, p2). As a result, terminals A and B remain.

Then, the terminal ID acquisition and narrow-down unit 80 narrows down by using terminal ID candidates of (time, place)=(t3, p3). As a result, there remains only the terminal B. Therefore, the terminal B is identified as the target terminal ID.

Application processing may be added as a base of the basic narrowing down processing in the terminal ID acquisition and narrow-down unit 80, as the first and second methods described above. For example, since a target object (person) does not necessarily possess a terminal (inclusive of a case in which the communication carrier of the terminal is different), the terminal ID acquisition and narrow-down unit 80 repeats the narrowing down processing a plurality of times (for example, in such a case in which the same terminal ID is detected/identified multiple times at different time or locations apart from each other), thereby improving the narrow-down accuracy of the terminal ID.

Further, assuming a case in which a target terminal ID is not necessarily detected, such as when there is a target at a cell/sector boundary, the terminal ID may be identified as the terminal ID candidate if the terminal ID is included in a different time and at a different location with a predetermined probability. Furthermore, the terminal ID candidate may be identified while handling the terminal ID candidate information on the cell boundary as reference information.

As described above, according to the second example embodiment, the wireless communication apparatus 201 is configured such that based on cell/sector information of a base station serving a target object that is estimated by the face authentication processing or the like, using image captured by a camera and a target direction information (direction viewed from a base station, for example), the wireless communication apparatus 201 detects a terminal ID by wireless antenna directivity control (such as the user specific clustering unit 63, and antenna parameter for cell related signal calculation unit 73). Thus, it is possible to identify (narrow down) target terminal ID candidates with higher accuracy even when there are a plurality of terminals in a cell/sector of a base station.

Further, according to the second example embodiment, by coordinating information at a plurality of detection points temporally/spatially, or by using a registered ID list (whitelist), it is possible to narrow down terminal ID candidates.

According to the second example embodiment, for example, at least one of the face authentication unit 41, the user location estimation unit 50, the user clustering unit 60, the terminal ID acquisition and narrow-down unit 80, and the antenna directivity control parameter calculation unit 70 is configured to operate on an edge server arranged in a vicinity of the base station or a node of a core network, a latency of a network can be reduced and speed up can be realized. Thus, even when one or more terminals move, it is possible to identify (narrow down) terminal ID candidates at a high speed and with high accuracy.

As a modification of the second example embodiment, the face authentication unit 41, the user location estimation unit 50, the user clustering unit 60, and the like in FIG. 7 may be constituted by an application unit, and between the base station processing unit 21 and the terminal ID acquisition and narrow-down unit 80. There may be provided an API (Application Programming Interface) that receives location related information, provides the information to the base station processing unit 21 and responds corresponding terminal ID information from the base station processing unit 21. API is an interface used by software components to communicate with each other.

Furthermore, as a variation example of the second example embodiment, there may be also provided an API for receiving the location related information and responding corresponding terminal ID information, wherein tracking and tracing the terminal location related information with respect to a plurality of detected terminal ID candidates may be performed, or controlling directivity (angle of view) of a camera to increase a probability that the target object is again captured by the camera may be performed.

As a further variation example of the second example embodiment, antenna directivity control may be performed until a user of a terminal ID specified in a black list can be identified by image processing. Initially, in order to identify a cell or sector in which a terminal of a terminal ID to be identified is served, a call may be made to the terminal and antenna directivity control within the identified cell or sector may be performed. Also, antenna directivity control of a cell or sector in an area specified by a control signal such as Tracking Area Update (TAU) or Routing Area Update (RAU) transmitted to a network by a terminal of a terminal ID to be identified, may be performed to detect a user (terminal) of a terminal ID to be identified.

As described above, according to the above-described embodiment, for example, the following advantageous effects can be expected (but not limited thereto).

(A) In a wireless communication apparatus performing base station processing, in contradistinction with as a method of detecting a user location by general antenna steering, and a method of estimating a wireless propagation path (channel matrix) to calculate a precoding weight by a matrix operation, it is possible to obtain an antenna directivity control parameter with desired precision or higher accuracy, while reducing a processing time and a calculation amount.

The reason is as follows. For example, according to the first example embodiment, the wireless communication apparatus 200 estimates a location of a user who is a terminal user by image processing, calculates an antenna directivity control parameter based on estimated location related information. That is, regardless of directivity of an antenna or a shape of a current cell, a location of a user can be grasped. Therefore, it is possible to calculate and select an antenna directivity control parameter with high performance, for example by selecting an orthogonal beam set, without requiring complicated calculation.

For example, when dynamic cell formation is performed according to user distribution, a result of load balancing clustering for dynamic cell formation may be used. Thus, it is possible to select an appropriate cell shape without receiving propagation path information (channel estimation values, or the like) on a plurality of base station cells from user terminals.

In addition, when spatially multiplexed transmission by user-specific beam forming (Multi-User MIMO) is performed, based on a result of multi-user clustering (orthogonal beam selection) for user specific beam forming, precoding weight calculation can be simplified.

(B) It is possible to identify (narrow down) a target terminal ID candidate with higher accuracy, when identifying a target terminal ID detected by an application such as video surveillance (face authentication processing), or the like.

The reason is as follows. For example, according to the second example embodiment, there is provided a terminal ID detection function using on wireless antenna directivity control, based on target object serving cell/sector information and direction information estimated from the face authentication process or the like that uses camera image (the user specific clustering unit 63, the antenna parameter for cell related signal calculation unit 73 and the like). Therefore, even when there are a plurality of terminals in a cell/sector of a base station, by narrowing down a transmission/reception space using antenna directivity, it is possible to identify (narrow down) a target terminal ID candidate(s) with higher accuracy.

In addition, it is possible to further narrow down terminal ID candidates by coordinating information at a plurality of detection points thereof in time/space or by using a registered ID list (whitelist).

Furthermore, according to the second example embodiment, by providing an API configured to receive location related information and respond corresponding terminal ID information, by tracking and tracing the terminal location related information with respect to a plurality of detected ID candidates, or by controlling directivity (angle of view) of a camera to increase a probability that an target object is again captured by a camera, it is possible to further enhance a narrowing down accuracy and high-speed operation.

As described above in the related art, in a method of identifying a terminal ID possessed by a target object (specific user) detected by a surveillance camera or the like, in a case where an area (cell/sector) of a base station serving a detected target object is estimated, and the base station searches an ID of a terminal served by a base station cell/sector to find a target terminal ID candidate, since a cell/sector range which is a base station area is relatively wide (even in the case of a small cell, about 100 m), the number of detected terminal ID candidates increases. Thus, there is a problem that it is difficult to narrow down terminal ID candidates. Also, since a series of processing delays are large, even if the number of terminal ID candidates is small, there is also a problem that the terminal ID cannot be identified when a target object moves.

The second example embodiment makes it possible to solve these problems of the related art.

FIG. 15 is a diagram for explaining another mode of the antenna directivity control signal generating apparatus 220 described with reference to FIG. 14. Referring to FIG. 15, the antenna directivity control signal generating apparatus 220 includes a processor 221, a memory 222, and an interface 223.

The interface 223 may have an interface for receiving input of image data. For example, the interface 223 may include an interface for performing communication with the RRU 100, a camera 500 (FIG. 14), or a communication with the base station processing unit 20.

The memory 222 may include a DRAM (Dynamic Random Access Memory), a SRAM (Static Random Access Memory), a rewritable ROM (Read-Only Memory) such as an EEPROM (Electrically Erasable Programmable Read-Only Memory), an SSD (Solid State Drive), a HDD (Hard Disk Drive), a CD-ROM, a DVD-ROM, or the like, or a combination thereof. The memory 222 may store image processing data generated by image processing.

By loading a program stored in the memory 222 in a main memory or the like in the processor 221 which executes the loaded program, at least part or all of processing in each unit of FIG. 14, at least part or all of processing in each unit of 40, 50, 60, and 70 in the wireless communication apparatus 200 of FIG. 1 that is referred to in the first example embodiment, or at least part or all of the processing in each unit of 21, 41, 50, 60, an 70 in the wireless communication apparatus 201 of FIG. 7 that is referred to in the second example embodiment, may be realized.

The processor 221 may be configured to execute processing of calculating antenna directivity control parameter of a base station on the basis of image processing data stored in the memory 222, for example. Alternatively, the processor 221 may execute image processing for recognizing one or more users from the image data, user location estimation processing for estimating user location information based on a recognition result of the image processing, user clustering processing for clustering a user for dynamic cell formation or user specific beam forming, based on location information of the user, and antenna directivity control parameter calculation processing for calculating a directivity control parameter of an antenna of the base station based on a result of the user clustering processing.

The above described embodiments may be attached, for example, as follows (but not limited to the following).
(Supplementary Note 1)
An antenna directivity control signal generating apparatus comprising:
a memory that stores image processing data generated by image processing; and
a processor that calculates an antenna directivity control parameter for a base station based on the image processing data.
(Supplementary Note 2)
The antenna directivity control signal generating apparatus according to supplementary note 1, further comprising
an interface that receives input of image data, wherein the processor performs:
image processing that recognizes one or more users from the image data;
user location estimation that estimates user location information based on a recognition result of the image processing;

user clustering processing that performs user clustering for dynamic cell formation, or for user specific beam forming, based on the user location information; and
antenna directivity control parameter calculation that calculates the antenna directivity control parameter for the base station, based on a result of the user clustering processing.
(Supplementary Note 3)
An antenna directivity control signal generating apparatus comprising:
an image processing unit that recognizes a user from received image data;
a user location estimation unit that estimates user location information based on a recognition result by the image processing unit;
a user clustering unit that performs clustering of users for formation of a dynamic cell or for user specific beam forming, based on the user location information; and
an antenna directivity control parameter calculation unit that calculates an antenna diversity control parameter for a base station based on a result of the user clustering unit.
(Supplementary Note 4)
The antenna directivity control signal generating apparatus according to supplementary note 3, wherein the user location estimation unit includes:
a first user direction estimation unit that estimates a direction of a user from a camera that images the image data; and
a second user direction estimation unit that estimates a direction of the user viewed from the base station.
(Supplementary Note 5)
The antenna directivity control signal generating apparatus according to supplementary note 3, or 4, wherein the user clustering unit includes:
a storage unit that stores in advance a set of parameters of a cell shape or a set of orthogonal beams, wherein the user clustering unit clusters the user by selecting from among the parameter set of the cell shape or the set of the orthogonal beams registered in the storage unit.
(Supplementary Note 6)
The antenna directivity control signal generating apparatus according to any one of supplementary notes 3 to 5, wherein the user clustering unit includes:
a multi-user clustering unit for user specific beam forming, and the antenna directivity control parameter calculation unit includes a calculation unit that calculates antenna parameters for user specific data.
(Supplementary note 7)
The antenna directivity control signal generating apparatus according to any one of supplementary notes 3 to 6, wherein the user clustering unit includes:
a clustering unit that performs load balancing user clustering for dynamic cell formation, and
the antenna directivity control parameter calculation unit includes a calculation unit that calculates an antenna parameter for a cell related signal.
(Supplementary Note 8)
The antenna directivity control signal generating apparatus according to any one of supplementary notes 3 to 5, wherein the user clustering unit includes:
a user specific clustering unit that detects a terminal ID of the wireless communication terminal, wherein
the antenna directivity control parameter calculation unit includes
a calculation unit that calculates an antenna parameter for a cell related signal.

(Supplementary Note 9)
The antenna directivity control signal generating apparatus according to any one of supplementary notes 3 to 8, wherein the image processing unit comprises a face authentication unit that performs face authentication from the image data.
(Supplementary Note 10)
The antenna directivity control signal generating apparatus according to any one of supplementary notes 3 to 9, further comprising:
 a first terminal ID narrow-down unit that narrows down terminal ID candidates of the wireless communication terminal by coordinating a plurality of ID candidate information temporally or spatially; and
 a second terminal ID narrowing down processing that registers in advance a white list that is not a terminal ID candidate and narrows down the terminal ID candidates of the wireless communication terminal.
(Supplementary note 11)
A wireless communication apparatus comprising
 a base station processing unit that performs at least a control function of an antenna of a base station that communicates with a wireless communication terminal, wherein
 the base station processing unit receives an antenna directivity control signal from the antenna directivity control signal generating apparatus according to any one of supplementary notes 1 to 10, and
 based on the antenna directivity control signal, performs antenna directivity control for the base station.
(Supplementary Note 12)
The wireless communication apparatus according to supplementary note 11, wherein the base station processing unit controls directivity of a reception antenna of the base station when receiving an uplink signal from the wireless communication terminal in order to detect a terminal ID of the wireless communication terminal, or
 controls directivity of a transmission antenna of the base station when transmitting a downlink signal to the wireless communication terminal.
(Supplementary note 13)
A wireless communication system comprising:
 an apparatus that performs at least a control function of an antenna of a base station that communicates with a wireless communication terminal;
 an antenna directivity control signal generating apparatus that generates a signal for controlling a directivity control signal of the antenna, wherein
 the antenna directivity control signal generating apparatus comprising:
 a memory that stores image processing data generated by image processing; and
 a processor that calculates an antenna directivity control parameter for a base station based on the image processing data.
(Supplementary Note 14)
The wireless communication system according to supplementary note 13, wherein the antenna directivity control signal generating apparatus further comprises an interface that receives input of image data, wherein
the processor performs:
 image processing that recognizes one or more users from the image data;
 user location estimation processing that estimates user location information based on a recognition result of the image processing;
 user clustering processing that performs user clustering for dynamic cell formation, or for user specific beam forming, based on the user location information; and
 antenna directivity control parameter calculation that calculates the antenna directivity control parameter for the base station, based on a result of the user clustering processing.
(Supplementary Note 15)
An antenna control method comprising:
 a step of storing image processing data generated by image processing; and
 a step of calculating a directivity control parameter of an antenna of a base station, based on the image processing data.
(Supplementary Note 16)
The antenna control method according to supplementary note 15, comprising:
 a step of receiving input of image data;
 an image processing step of recognizing one or more users from the image data;
 a user location estimation step of estimating user location information based on a recognition result of the image processing step;
 a user clustering processing step of performing clustering of users for dynamic cell formation, or for user specific beam forming, based on the user location information; and
 an antenna directivity control parameter calculation of calculating the antenna directivity control parameter for the base station, based on a result of the user clustering processing step.
(Supplementary note 17)
The antenna control method according to supplementary note 16, wherein the user location estimation step includes:
 a first user direction estimating step of estimating a direction of a user from a camera that images the image data; and
 a second user direction estimating step of estimating a direction of the user viewed from the base station.
(Supplementary Note 18)
The antenna control method according to supplementary note 16 or 17, wherein the user clustering step includes:
 registering a set of cell shape parameters or a set of orthogonal beams in advance in a storage unit; and
 performing clustering of the user by selecting from among the parameter set of the cell shape or the set of the orthogonal beams registered in the storage unit.
(Supplementary note 19)
The antenna control method according to any one of supplementary note 16 to 18, wherein the user clustering step includes:
 a multi-user clustering step for user specific beam forming, and wherein the antenna directivity control parameter calculation step includes a calculation step of calculating antenna parameters for user specific data.
(Supplementary note 20)
The antenna control method according to any one of supplementary note 16 to 19, wherein the user clustering step includes:
 a clustering step of clustering users by load balancing for dynamic cell formation, and wherein the antenna directivity control parameter calculation step includes a calculation step of calculating a parameter of the antenna for the cell related signal.
(Supplementary note 21)
The antenna control method according to any one of supplementary note 16 to 18, wherein the user clustering step includes:
 a user specific clustering step of detecting a terminal ID of the wireless communication terminal, wherein the antenna directivity control parameter calculation step includes a step of calculating an antenna parameter for a cell related signal.

(Supplementary note 22)
The antenna control method according to any one of supplementary note 16 to 21, wherein the image processing step includes a face authentication step of performing face authentication from the image data.

(Supplementary note 23)
The antenna control method according to any one of supplementary note 16 to 22, comprising
a step of controlling directivity of a reception antenna of the base station when receiving an uplink signal from the wireless communication terminal in order to detect a terminal ID of the wireless communication terminal, or
controlling directivity of a transmission antenna of the base station when transmitting a downlink signal to the wireless communication terminal.

(Supplementary note 24)
The antenna control method according to any one of supplementary note 16 to 23, comprising
a first terminal ID narrow down step of narrowing down terminal ID candidates of the wireless communication terminal by coordinating a plurality of ID candidate information temporally or spatially; and
a second terminal ID narrow down step of registering a whitelist which is not a candidate in advance and narrowing down terminal ID candidates of the wireless communication terminal.

(Supplementary note 25)
A non-transitory computer readable medium storing therein a program causing a computer to execute processing comprising:
storing image processing data generated by image processing in a memory, and
calculating an antenna directivity control parameter for a base station based on the image processing data.

(Supplementary Note 26)
The non-transitory computer readable medium according to supplementary note 25, storing the program that causes the computer to execute processing comprising:
receiving input of image data via an interface;
image processing that recognizes one or more users from the image data;
user location estimation processing that estimates user location information based on a recognition result of the image processing;
user clustering processing that performs user clustering for dynamic cell formation or user specific beam forming, based on the user location information; and
antenna directivity control parameter calculation processing that calculates the antenna directivity control parameter for the base station, based on a result of the user clustering processing.

(Supplementary note 27)
The non-transitory computer readable medium according to supplementary note 26, wherein the user location estimation processing includes:
a first user direction estimating processing that estimates a direction of a user from a camera that images the image data; and
a second user direction estimating processing that estimates a direction of the user viewed from the base station.

(Supplementary note 28)
The non-transitory computer readable medium according to supplementary note 26 or 27, wherein the user clustering processing includes:
registering a set of cell shape parameters or a set of orthogonal beams in advance in a storage unit, and
performing user clustering by selecting from among the cell shape parameter set or the orthogonal beam set registered in the storage unit.

(Supplementary note 29)
The non-transitory computer readable medium according to any one of supplementary notes 26 to 28, wherein the user clustering processing performs a multi-user clustering process for user specific beam forming, and wherein the antenna directivity control parameter calculation processing calculates antenna parameters for user specific data.

(Supplementary note 30)
The non-transitory computer readable medium according to any one of supplementary notes 26 to 29, wherein the user clustering processing performs user clustering by load balancing for dynamic cell formation, and wherein
the antenna directivity control parameter calculation processing calculates ab antenna parameter for a cell related signal.

(Supplementary note 31)
The program according to any one of supplementary notes 26 to 28, wherein the user clustering processing performs user specific clustering processing that detects a terminal ID of the wireless communication terminal, and wherein
the antenna directivity control parameter calculation processing calculates an antenna parameter for a cell related signal.

(Supplementary Note 32)
The non-transitory computer readable medium according to any one of supplementary notes 26 to 31, wherein the image processing includes face authentication processing for performing face authentication from the image data.

(Supplementary note 33)
The medium according to any one of supplementary notes 26 to 32, comprising processing that controls directivity of a reception antenna of the base station when receiving an uplink signal from the wireless communication terminal to detect a terminal ID of the wireless communication terminal, or
controls directivity of a transmission antenna of the base station when transmitting a downlink signal to the wireless communication terminal.

(Supplementary note 34)
The non-transitory computer readable medium according to any one of supplementary notes 26 to 33, storing the program that causes the computer to execute processing comprising:
a first terminal ID narrow down processing that narrows down terminal ID candidates of the wireless communication terminal by coordinating a plurality of ID candidate information temporally or spatially; and
a second terminal ID narrow down processing that registers a whitelist which is not a candidate in advance and narrows down terminal ID candidates of the wireless communication terminal.

Each disclosure of the above-listed Patent Literature 1 is incorporated herein by reference. Modification and adjustment of each example embodiment and each example are possible within the scope of the overall disclosure (including the claims) of the present invention and based on the basic technical concept of the present invention. Various combinations and selections of various disclosed elements (including each element in each Supplementary Note, each element in each example, each element in each drawing, and so forth) are possible within the scope of the claims of the present invention. That is, the present invention includes as a matter of course various variations and modifications that could be made by those skilled in the art according to the overall disclosure including the claims and the technical concept.

The invention claimed is:

1. An antenna directivity control signal generating apparatus comprising:
an interface configured to receive input of image data;
a memory configured to store image processing data generated by image processing; and
a processor, wherein
the processor is configured to perform:
the image processing that recognizes one or more users from the image data;
user location estimation that estimates user location information of the one or more users, based on a recognition result of the image processing;
user clustering processing that performs user clustering for dynamic cell formation, or for user specific beam forming, based on user location information; and
antenna directivity control parameter calculation that calculates an antenna directivity control parameter for a base station, based on a result of the user clustering processing.

2. The antenna directivity control signal generating apparatus according to claim 1, wherein the processor performs, as the user location estimation,
a first user direction estimation that estimates a direction of at least one use of the one or more users from a camera that images the image data, and
a second user direction estimation that estimates a direction of the at least one user viewed from the base station.

3. The antenna directivity control signal generating apparatus according to claim 1, comprising
a storage unit that stores in advance a set of parameters of a cell shape or a set of orthogonal beams, wherein
the processor performs, as the user clustering processing, user clustering by selecting from among the set of parameters of the cell shape or the set of the orthogonal beams registered in the storage unit.

4. The antenna directivity control signal generating apparatus according to claim 1, wherein
the processor performs, as the user clustering processing, multi-user clustering processing for user specific beam forming, and
calculates, as the antenna directivity control parameter calculation, an antenna parameter for user specific data.

5. The antenna directivity control signal generating apparatus according to claim 1, wherein
the processor performs, as the user clustering processing, clustering processing that performs load balancing clustering of users for dynamic cell formation, and
calculates, as the antenna directivity control parameter calculation, an antenna parameter for a cell related signal.

6. The antenna directivity control signal generating apparatus according to claim 1, wherein
the processor performs, as the user clustering processing, user specific clustering processing for detection of a terminal ID of a wireless communication terminal, and
the processor, as the antenna directivity control parameter calculation, calculates an antenna parameter for a cell related signal.

7. The antenna directivity control signal generating apparatus according to claim 1, wherein the processor performs at least one of,
a first terminal ID narrowing down processing that narrows down terminal ID candidates of a wireless communication terminal by cooperating a plurality items of ID candidate information temporally or spatially; and
a second terminal ID narrowing down processing that registers in advance a white list that is not a terminal ID candidate and narrows down the terminal ID candidates of the wireless communication terminal.

8. A wireless communication apparatus comprising
a base station processing unit that performs at least a control function of an antenna of a base station that communicates with a wireless communication terminal, wherein
the base station processing unit receives an antenna directivity control signal from the antenna directivity control signal generating apparatus according to claim 1, and
based on the antenna directivity control signal, performs antenna directivity control for the base station.

9. The antenna directivity control signal generating apparatus according to claim 1, wherein the processor performs load balancing clustering for dynamic cell formation processing including balancing of user-number among cells; and deriving a cell shape parameter, and
the processor calculates the antenna directivity control parameter for the base station based on the cell shape parameter.

10. The antenna directivity control signal generating apparatus according to claim 1, wherein the processor performs as the user clustering for user specific beam forming, multi-user clustering for MU-MIMO (Multi User Multi-Input Multi-Output) processing including clustering of beam allocation such that each user is separated by orthogonal beams to derive an orthogonal beam parameter, and
the processor calculates the antenna directivity control parameter for the base station based on the orthogonal beam parameter.

11. The antenna directivity control signal generating apparatus according to claim 6, wherein the processor performs, as the user specific clustering processing, when detecting the terminal ID of the wireless communication terminal, user specific beam clustering such that a target object is separated by orthogonal beams to derive an orthogonal beam parameter, and
the processor calculates the antenna directivity control parameter for the base station based on the orthogonal beam parameter.

12. The antenna directivity control signal generating apparatus according to claim 6, wherein the terminal ID includes at least one of:
IP (Internet Protocol) address information of the wireless communication terminal;
subscriber Identity Module (SIM) card information inserted in the wireless communication terminal;
terminal model information of the wireless communication terminal;
phone number of the wireless communication terminal;
unique information such as serial number of the wireless communication terminal;
TEID (Tunnel Endpoint Identifier) (tunnel identifier of GPS (GPRS Tunneling protocol) tunnel);
C-RNTI (Cell-Radio Network Temporary Identifier) information;
IMSI (International Mobile Subscriber Identity); and
TMSI (Temporary Mobile Subscriber Identity).

13. A wireless communication system comprising:
an apparatus that performs at least an antenna control function for a base station that communicates with a wireless communication terminal; and
an antenna directivity control signal generating apparatus that generates a signal for controlling directivity of the antenna, wherein
the antenna directivity control signal generating apparatus comprises:
an interface configured to receive input of image date,
a memory configured to store image processing data generated by image processing; and
a processor, wherein
the processor is configured to perform:
the image processing that recognizes one or more users from the image data;
user location estimation that estimates user location information of the one or more users, based on a recognition result of the image processing;
user clustering processing that performs user clustering for dynamic cell formation, or for user specific beam forming, based on user location information; and
antenna directivity control parameter calculation that calculates an antenna directivity control parameter for the base station, based on a result of the user clustering processing.

14. An antenna control method comprising:
receiving input of image data,
performing image processing that recognizes one or more users from the image data;
estimating user location information of the one or more users, based on the recognition result of the image processing;
performing user clustering for dynamic cell formation, or for user specific beam forming, based on user location information;
calculating an antenna directivity control parameter for a base station, based on a result of the user clustering.

15. A non-transitory computer readable medium storing therein a program causing a computer to execute processing comprising:
receiving input of image date,
performing image processing that recognizes one or more users from the image data;
estimating user location information of the one or more users, based on the recognition result of the image processing;
performing user clustering for dynamic cell formation, or for user specific beam forming, based on user location information; and
calculating an antenna directivity control parameter for a base station based on a result of the user clustering.

* * * * *